United States Patent [19]

Kugisawa et al.

[11] 4,254,681

[45] Mar. 10, 1981

[54] MUSICAL WAVESHAPE PROCESSING SYSTEM

[75] Inventors: Toshio Kugisawa, Hamamatsu; Noriji Sakashita, Shizuoka, both of Japan

[73] Assignee: Kabushiki Kaisha Kawai Gakki Seisakusho, Hamamatsu, Japan

[21] Appl. No.: 892,328

[22] Filed: Mar. 31, 1978

[30] Foreign Application Priority Data

| | | | |
|---|---|---|---|
| Apr. 8, 1977 | [JP] | Japan | 52-40115 |
| Apr. 8, 1977 | [JP] | Japan | 52-40116 |
| Apr. 8, 1977 | [JP] | Japan | 52-40117 |

[51] Int. Cl.[3] .......... G10F 1/00; G06F 1/02

[52] U.S. Cl. .......... 84/1.01; 84/1.13; 84/1.26; 364/718

[58] Field of Search .......... 84/1.01, 1.13, 1.26; 364/718

[56] References Cited

U.S. PATENT DOCUMENTS

| | | | |
|---|---|---|---|
| 3,821,714 | 6/1974 | Tomisawa et al. | 84/1.01 |
| 3,981,217 | 9/1976 | Oya | 84/1.01 |
| 3,986,423 | 10/1976 | Rossum | 84/1.01 |
| 4,022,098 | 5/1977 | Deutsch et al. | 84/1.01 |
| 4,041,825 | 8/1977 | Pascetta | 84/1.01 |
| 4,079,650 | 3/1978 | Deutsch et al. | 84/1.01 |
| 4,083,283 | 4/1978 | Hiyoshi et al. | 84/1.26 |
| 4,085,644 | 4/1978 | Deutsch et al. | 84/1.03 |
| 4,114,495 | 9/1978 | Tomisawa | 84/1.01 |
| 4,138,916 | 2/1979 | Kitagawa | 84/1.01 |
| 4,141,268 | 2/1979 | Kugisawa | 84/1.01 |
| 4,154,133 | 5/1979 | Kitawaga | 84/1.24 |

*Primary Examiner*—Gene Z. Rubinson
*Assistant Examiner*—Forester W. Isen

[57] ABSTRACT

A musical waveshape processing system for an electronic musical instrument in which time-division time slots are set corresponding to a plurality of channels for producing notes selected on keyboards of the electronic musical instrument and the notes are each produced by repeatedly calculating the musical waveshape amplitude value of each channel in each time-division time slot. A musical waveshape calculator is provided which calculates the musical waveshape amplitude value as $f(t)=at^2+bt+c$ based on waveshape data a, b and c and address information t. A multiplier is provided by which the value of an envelope synchronized with the time-division time slot is multiplied by the waveshape data a, b and c. A tone control circuit is provided which counts time-division multiplex signals of the ON-OFF state of a tone selection switch with a counter every frame of the time-division multiplexing and compares the count values of two successive frames to detect a change in the state of the tone selection switch from non-coincidence between the both count value, thereby controlling the musical waveshape.

4 Claims, 26 Drawing Figures

MUSICAL WAVESHAPE PROCESSING SYSTEM

BACKGROUND OF THE INVENTION

1. Field of the Invention

This invention relates to a musical waveshape processing system for an electronic musical instrument in which time-division time slots are set corresponding to a plurality of channels and the musical waveshape amplitude value of each channel is repeatedly calculated to produce a note.

2. Description of the Prior Art

In recent years, there have been proposed a variety of electronic musical instruments employing digital techniques. Such electronic musical instruments are excellent in that a musical waveshape, an envelope waveshape and a frequency can be controlled easily at will, as compared with conventional electronic musical instruments using analog techniques. A digital circuit is suitable for fabrication as an integrated circuit, and hence provides for enhanced reliability and suited for reduction of the circuit scale. In the abovesaid electronic musical instruments, however, note producing channels are provided for the reduction of the circuit scale, the number of keys which can be simultaneously depressed for producing notes is limited to 10 to 15 but, in general, musical waveshape memories equal to (the number of tone systems)×(the number of channels) are required for producing notes separately for respective tone systems, for example, flute, string, reed and like ones. However, the provision of some dozens of musical waveshape memories imposes a severe limitation on the reduction of the circuit scale. Recently, a peculiar digital organ has been proposed in which a waveshape amplitude value is calculated by inverse Fourier transformation in a time-divided time $t_x$. The time $t_x$ is subdivided into 16 time slots and, in the respective time slots, first to sixteenth harmonics are calculated. With this method, the circuit structure used is much simplified as compared with the abovesaid method but it is necessary to raise the time-division frequency for further division of the time slot in each channel to the number of harmonics (for instance, 16). Accordingly, processing for the time-division frequency is complicated. The present inventors have found that since the above problem basically arises from the calculation method, if the calculation method using a function, which had already been proposed by the present applicants, is employed, processing can be achieved at a lower time-division frequency only by providing time-division time slots corresponding to a plurality of channels because the time slots need not be further divided, and that since a note can be produced directly be carrying out the musical waveshape calculation and envelope addition in synchronism with each of the time-division slots corresponding to the channels, the musical waveshape memory part can be simplified.

SUMMARY OF THE INVENTION

An object of this invention is to provide an electronic musical instrument system of non-real-time processing which obtains a musical waveshape by calculation using waveshape approximation with a functional formula.

Another object of this invention is to provide a simplified musical note processing system for obtaining musical waveshape amplitude values in a plurality of channels.

Another object of this invention is to provide an electronic musical instrument in which the musical waveshape calculation for obtaining musical waveshape amplitude values in a plurality of channels and the provision of an envelope are simplified.

Still another object of this invention is to provide an electronic musical instrument in which a change in the state of a tone selection switch can be immediately detected using a time-division multiplex signal.

DESCRIPTION OF THE PREFERRED EMBODIMENTS

The outline of an electronic musical instrument embodying this invention is as follows: A musical waveshape is divided into a plurality of periods, each period is approximated using a function, the approximate parameter is read out of a memory circuit in a time-division time slot corresponding to a note producing channel and a complex musical waveshape is obtained by approximate calculation, whereby a note can be produced immediately.

Figure 1:
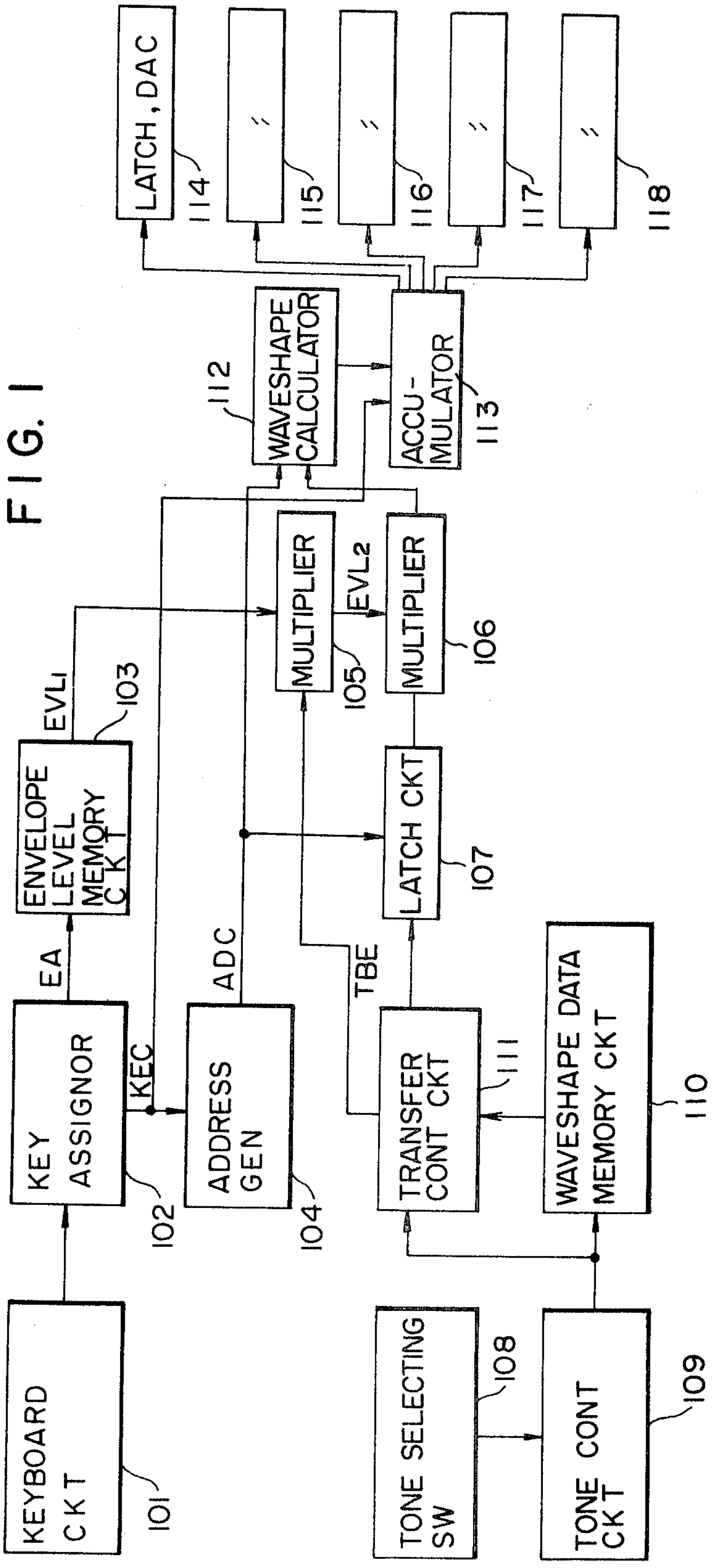
FIG. 1 is a block diagram illustrating the overall structure of an electronic musical instrument embodying this invention.

FIG. 1 is explanatory of the overall structure of an electronic musical instrument embodying this invention. In FIG. 1, key switch ON-OFF information from a keyboard circuit 101 is applied to a key assignor 102 to assign a channel to each key switch in its ON state and the key code corresponding to the key switch is temporarily stored in the key assignor 102. The key assignor 102 provides an envelope address signal EA to an envelope level memory circuit 103 corresponding to the channel being occupied. At the same time, the key code stored in the key assignor 102 is time divided and applied as a key code signal KEC to an address generator 104 and an accumulator 113. The envelope level memory circuit 103 reads out the envelope level of each channel with the envelope address signal EA supplied from an envelope control part of the key assignor 102 and provides the read output as an envelope level signal $EVL_1$ to a multiplier 105. The address generator 104 selects an address signal occurring in each scale with the key code signal KEC from the key assignor 102 and applies the selected address signal as an address code ADC to a latch circuit 107 and a waveshape calculator 112.

The ON-OFF state of a tone selecting switch 108 is detected by a tone control circuit 109 and waveshape data, which are parameters for determining a musical waveshape when the ON-OFF state has altered, are read out of a waveshape data memory circuit 110 and added in accordance with the state of the tone selecting switch 108 to calculate complex waveshape data, which are written in the latch circuit 107 under the control of a transfer control circuit 111. The complex waveshape data written in the latch circuit 107 are read out therefrom with the address code ADC and provided to the multiplier 106. In the multiplier 105 a tablet envelope signal TBE, developed at the time of the change in the state of the tone selecting switch 108, is multiplied by the envelope level signal $EVL_1$ to provide an envelope level signal $EVL_2$, which is multiplied by the complex waveshape data in the multiplier 106, then applied to the waveshape calculator 112. The tablet envelope signal TBE is provided by the transfer control circuit 111. In the waveshape calculator 112 amplitude values of the complex waveshape are calculated based on the complex waveshape data and the address code ADC, and applied as time-division waveshapes to an accumulator 113. In the accumulator 113 the waveshapes calculated and time divided for respective channels and tones are added for the respective tones, and latched and converted to analog signals by latch and D-A converters 114 through 118, each corresponding to one of the respective tones. The musical waveshape signals of the respective tones, thus converted to the analog forms, are reproduced by a sound system (not shown). A detailed description will be given with respect to the construction and operation of each of the abovesaid circuits.

Figure 2:
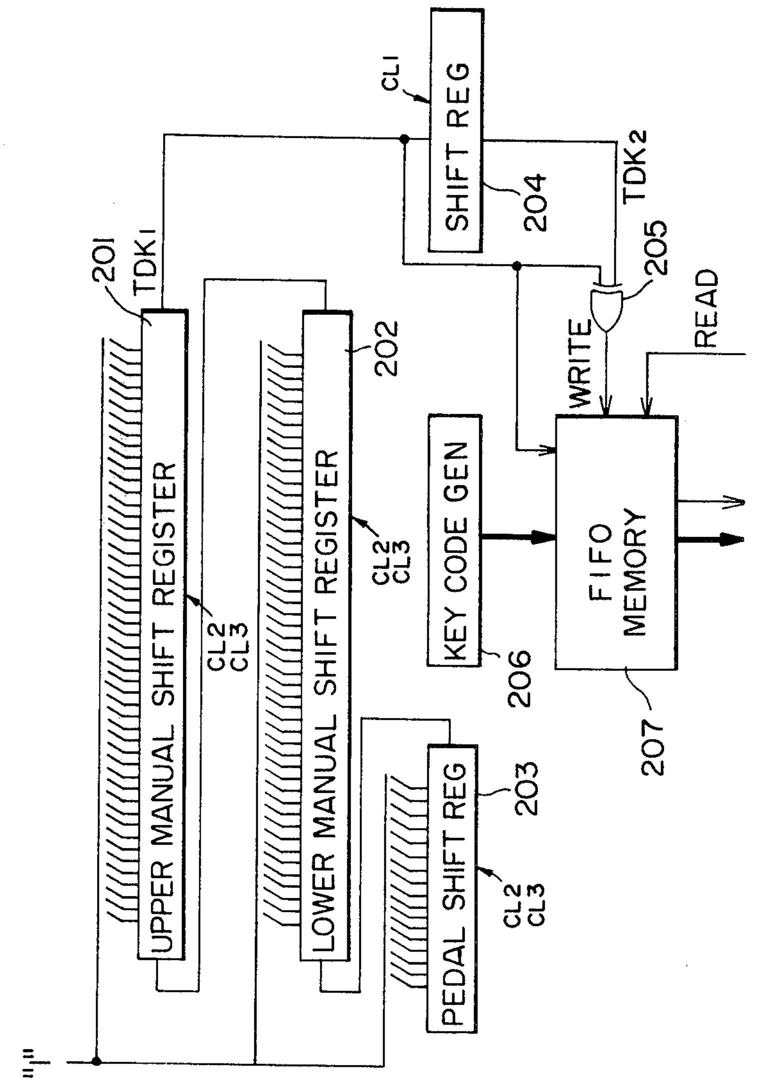
FIG. 2 is a detailed diagram explanatory of a keyboard circuit 101 in FIG. 1.

FIG. 2 is a detailed diagram explanatory of the keyboard circuit 101 shown in FIG. 1. In FIG. 2, assume that an upper manual and a lower manual both have 49 keys and that a pedal has 13 keys. The key switches of the keyboards are connected at one end to sampling shift registers, that is, an upper manual shift register 201, a lower manual shift register 202 and a pedal shift register 203, respectively, and held at the other end at the logical level "1". Each sampling shift register inputs therein in parallel the ON and OFF states of the key switches in the form of "1" and "0" with a clock CL2, and shifts serially with a clock CL3. The shift registers 201, 202 and 203 are connected in cascade. A time-division multiplex signal $TDK_1$ indicating the ON-OFF state of the key switch, provided from the upper manual shift register 201, is delayed by one time division period in a delay shift register 204 which shifts with a clock CL1 and comprises 122 stages, providing a delayed, time-division multiplex signal $TDK_2$. The time-division multiplex signal $TDK_1$ and the delayed time-division multiplex signal $TDK_2$ are provided to an exclusive OR gate 205 to detect a change in the ON-OFF state of the key switch and, at the timing of the key, the key code of the key switch is written in a buffer memory $F_1F_0$ 207. The key code is provided by a key code generator 206. At the abovesaid timing a new ON-OFF signal ("1" for the ON state and "0" for the OFF state) of the key is also written in the $F_1F_0$ memory 207.

Figure 3:
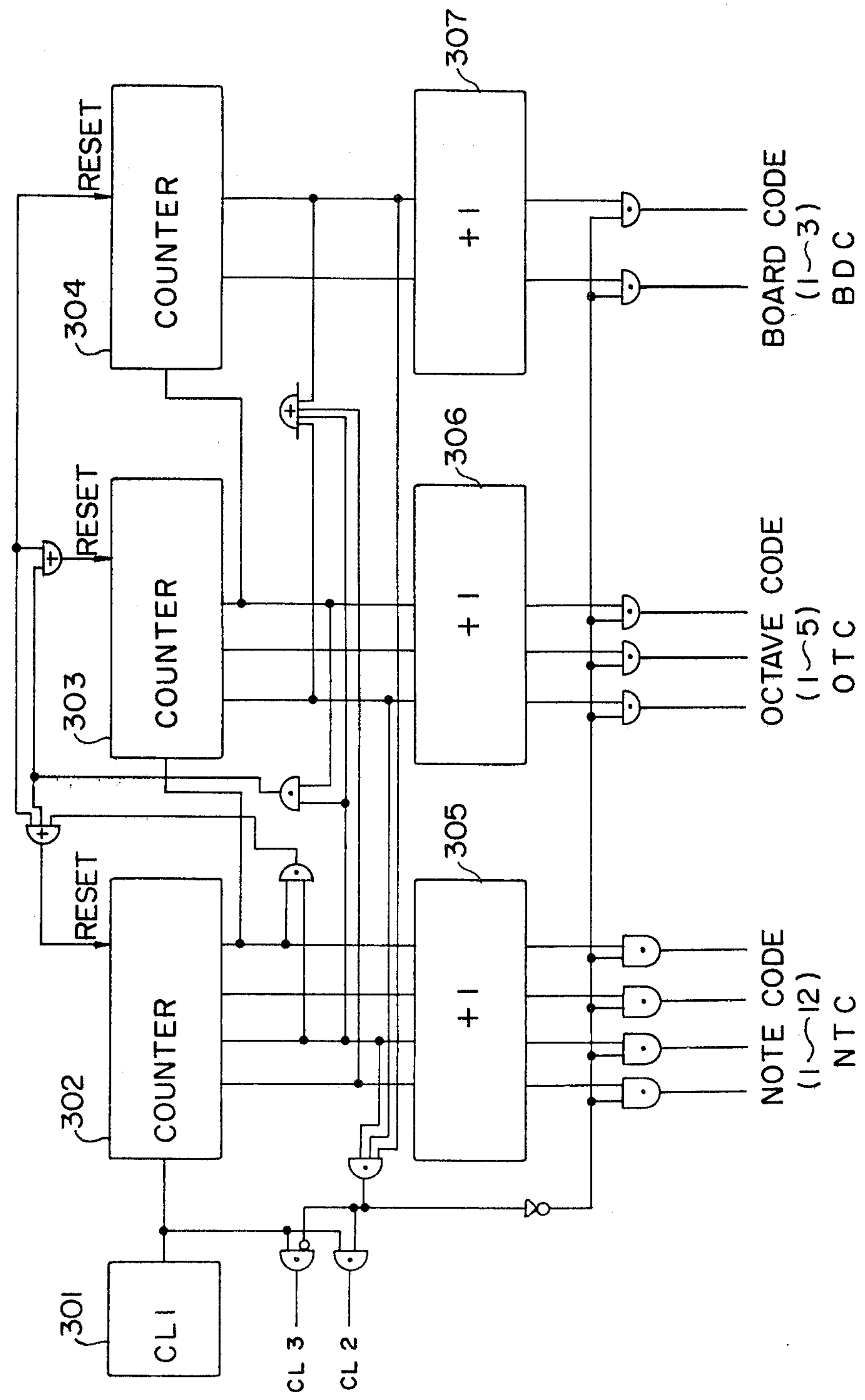
FIG. 3 is a detailed diagram explanatory of a key code generator 206 in FIG. 2.

FIG. 3 shows in detail the key code generator 206 used in FIG. 2. In FIG. 3, the clock CL1 from a clock generator 301 is counted by counters 302, 303 and 304 and their count values are outputted as a note code NTC, an octave code OTC and a board (keyboard) code BDC via adders 305, 306 and 307, respectively. Further, the key code generator 206 provides clocks CL2 and CL3 according to the logical states of the abovesaid count values.

Figure 4:
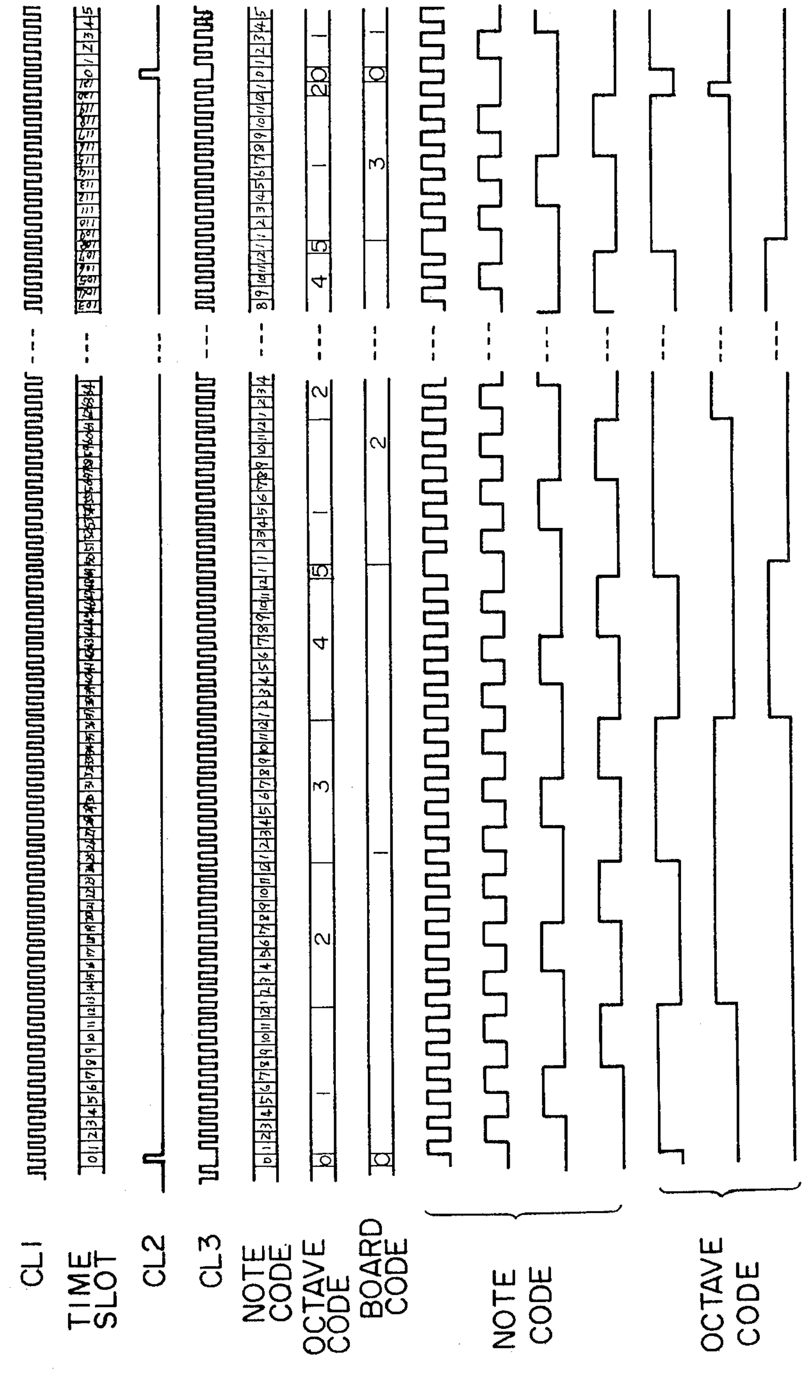
FIG. 4 is a waveform diagram explanatory of the operation in FIG. 3.

FIG. 4 illustrates by way of example the clock CL1 and its time slot, the clocks CL2 and CL3 produced based on the clock CL1, examples of the 4 bit (1 to 12) note code, the 3-bit (1 to 5) octave code and the 2-bit (1 to 3) board code and the waveforms of the note and octave codes.

Figure 5:
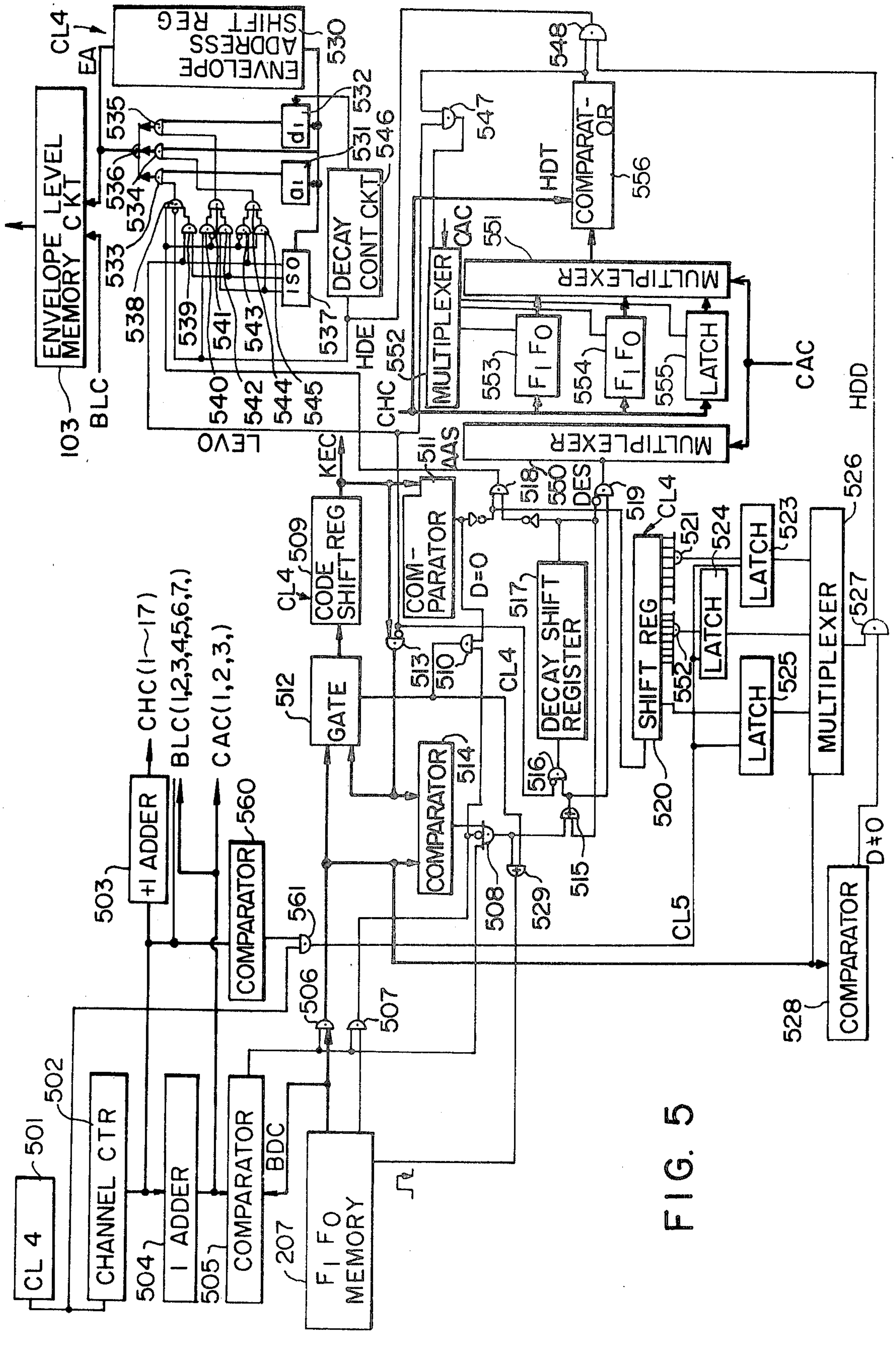
FIG. 5 is a detailed diagram explanatory of a key assignor 102 in FIG. 1.
Figure 7:
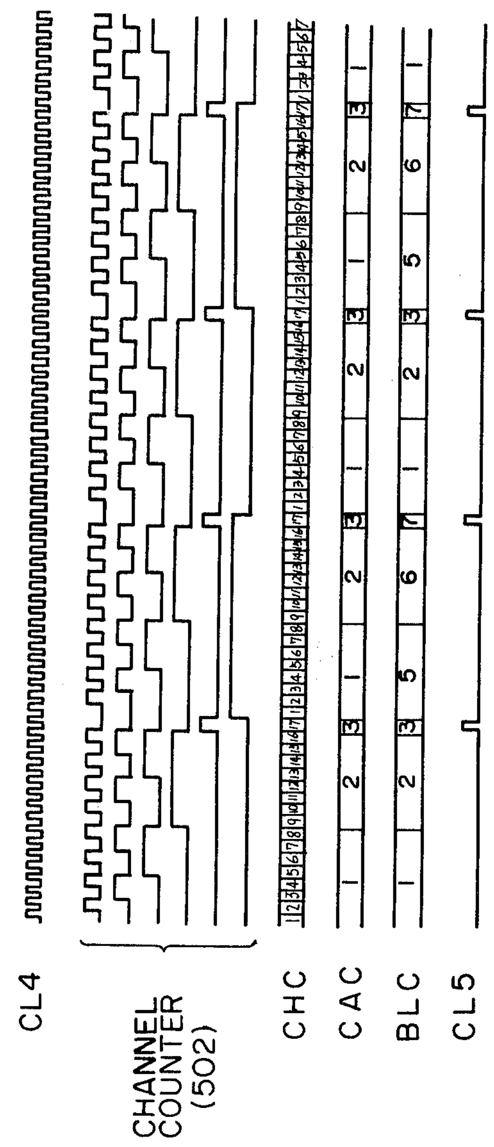
FIG. 7 shows examples of timings of waveforms of five stages of a channel counter 502 supplied with a clock CL4 in FIG. 5 and a channel code CHC, a channel area code CAC, a block code BLC and a write clock CL5 for a latch circuit which correspond to the waveforms.

FIG. 5 shows in detail the key assignor 102 utilized in FIG. 1 and FIG. 7 is a timing chart showing its operation.

In FIGS. 5 and 7, a clock CL4 from a clock generator 501 is provided to a channel counter 502. The channel counter 502 is composed of a 17-step counter having 5 stages and a binary counter having one stage, and counts the clock CL4. The count value (0 to 16) of the 17-step counter is applied to a +1 adder 503 to provide a channel code CHC (1 to 17) and the two higher order bits of the 17-step counter are added with 1 in a +1 adder 504 to provide a channel area code CAC. A block code BLC is derived from the output of the channel counter 502 and the channel area code CAC. A 2-bit key code BDC from a $F_1F_0$ memory 207 is compared with the channel area code CAC in a comparator 505 and when they match with each other, the comparator 505 produces a coincidence signal to open AND gates 506, 507 and 508. The number of channels is 17 in all: 8 for the upper manual, 8 for the lower manual and 1 for the pedal. The channel counter 502 counts the channel numbers. The channel area code CAC distinguishes the channels for the respective keyboards. A code shift register 509 comprises 17 stages, each corresponding to one of the channels. The operation of the key assignor 102 will hereinbelow be described in connection with the cases of the ON-OFF signal outputted from the $F_1F_0$ memory 207 being "1" and "0", respectively.

When the ON-OFF signal in the output from the $F_1F_0$ memory 207 is "1", the output "1" from the AND gate 507 is applied to an AND gate 510 in the corresponding channel area. When the output code of the code shift register 509 is zero, that is, in the case of an empty address with no key code being written in the corresponding channel, a non-occupancy signal is provided to the AND gate 510 applies the output "1" to a selecting gate circuit 512, which in turn selects the key code supplied thereto from the AND gate 506 and applies it to the code shift register 509. The code shift register 509 shifts with the clock CL4 and the key code written therein circulates via an AND gate 513 and the selecting gate circuit 512. The output from the code shift register 509 is provided as the key code signal KEC. Upon turning OFF of the key switch having been held in the ON state, the envelope coefficient is reduced to zero and the AND gate 513 is closed by a level zero signal $LEV_0$ in the time slot corresponding to the channel occupies by the key switch, thus cutting off the aforesaid key code loop to erase the key code.

When the ON-OFF signal in the output from the $F_1F_0$ memory 207 is "0", the key code from the $F_1F_0$ memory 207 is provided via the AND gate 506 to a comparator 514 in the corresponding channel area. Also, the key code from the AND gate 513 is applied to the comparator 514, which provides a coincidence signal to the AND gate 508 when the both key codes match with each other. On the other hand, where the ON-OFF signal from the AND gate 507 is "0", the AND gate 508 is open and its output signal "1" is applied as a decay signal to a decay shift register 517 via an OR gate 515 and an AND gate 516. The decay shift register 517 comprises 17 stages and shifts with the clock CL4 in synchronism with the code shift register 509. The decay signal circulates via the OR gate 515 and the AND gate 516 and is erased, as is the case with the key code signal, by the level zero signal $LEV_0$ in the AND gate 516 when the envelope address EA is zero. An AND gate 518, which provides the logical product of a channel occupancy signal inverted from the channel non-occupancy signal of the comparator 511 and a signal inverted from the decay signal of the decay shift register 517, outputs an attack sustain signal AAS. The signal ASS indicates that the key switch occupying the corresponding channel is in the ON state.

Upon writing the key code or the decay signal by the ON-OFF signal in the code shift register 509 or the decay shift register 517, a read signal is provided to the $F_1F_0$ memory 207 from an OR gate 529 to read out the next key code signal and ON-OFF signal with the trailing edge of the pulse. Based on the inversion of the decay signal from the OR gate 515 and the decay signal delayed by the decay shift register 517 and the logical product of the both signals, an AND gate 519 provides a decay start signal DES. The signal DES indicates that the key switch is turned OFF and that the envelope starts to decay. This signal DES occurs only once for one OFF state in the time slot corresponding to the key switch. The occupancy signal from the comparator 511 is applied to a high-speed decay shift register 520 and its 17 parallel outputs are divided into 8, 8 and 1 corresponding to the channel areas. The outputs from the shift register 520 are respectively applied via AND gates 521 and 522 to latch circuits 523, 524 and 525 and written therein by a clock CL5. The clock CL5 occurs in a time slot #17 every seventeen shots of the clock CL4 and are produced by a comparator 560 and an AND gate 561. The latch circuits 523, 524 and 525 indicate that the channels in the respective channel areas are all occupied. The latch circuit outputs are selected by a multiplexer 526 in accordance with the board code BDC included in the key code for the AND gate 506, and supplied to an AND gate 527. The abovesaid key code is also provided to a comparator 528 to enable the AND gate 527 when the key code is not zero. The output from the AND gate 527 is applied as a high-speed decay demand signal HDD to an AND gate 548.

Figure 8:
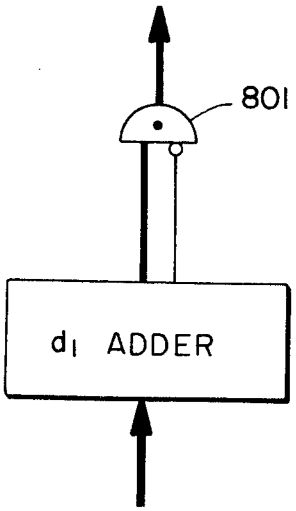
FIG. 8 is a circuit diagram explanatory of the operation of an adder 532 in FIG. 5.

An envelope address shift register 530 comprises 17 stages and stores the envelope address EA of each channel. The shift register 530 shifts with the clock CL4 in unison with the code shift register 509, the decay shift register 517 and the high-speed decay shift register 520. The envelope address EA circulates via a route of an adder 531 or 532, an AND gate 533, 534 or 535, an OR gate 536 and the envelope address shift register 530. The envelope address EA varies in the range of $0 \leq EA < 2$. A comparator 537 is supplied with the envelope address EA to provide a 1 signal in the case of $EA = 1$, and S signal in the cases of $0 < EA < 1$ and $1 < EA < 2$ and a 0 signal in the case of $EA = 0$. The attack sustain signal AAS is produced by the channel occupancy resulting from turning ON of the key switch and is eliminated by turning OFF of the key switch. The envelope address EA is initially zero. An AND gate 538 is enabled by the attack sustain signal ASS to provide a loop passing through the AND gate 533, the OR gate 536 and the envelope address shift register 530. This loop includes the adder 531, which adds $a_1$ to the input from the envelope address shift register 530. That is, $a_1$ is added to the envelope address EA each time it circulates through the loop. In this case, $a_1$ is selected so that $0 < a_1 << 1$. As the circulation is iterated, the envelope address EA approaches unity and when the address EA reaches unity, the AND gate 538 is closed and an AND gate 545 and an OR gate 544 are opened to provide the loop of the envelope address EA passing through the AND gate 534. This loop does not include any adder and the envelope address EA repetitively circulates via the loop while remaining at unity. When the key switch is turned OFF to alter the attack sustain signal to "0", the AND gate 545 is closed and an OR gate 540 is opened. At this time, an OR gate 542 is opened. At this time, an OR gate 542 is open and an AND gate 541 is enabled, providing the loop of the envelope EA passing through the AND gate 535. This loop includes the adder 532, which adds $d_1$ to the envelope address EA upon each circulation. In this instance, $d_1$ is selected such that $0 < d_1 << 1$. As the envelope address EA circulates repeatedly, its value approaches from 1 to 2. When the envelope address EA reaches 2, the adder 532 performs a carry and the envelope address EA becomes equal to zero ($0 \leq EA < 2$). Then, the AND gate 534 and the OR gate 544 are opened to maintain $EA = 0$. In this case, when the envelope address EA is carried by the adder 532 to be close to zero, an AND gate 801 is closed by a carry signal, as shown in FIG. 8, thereby to forcibly provide the value $EA = 0$, omitting the fraction part.

Figure 6:
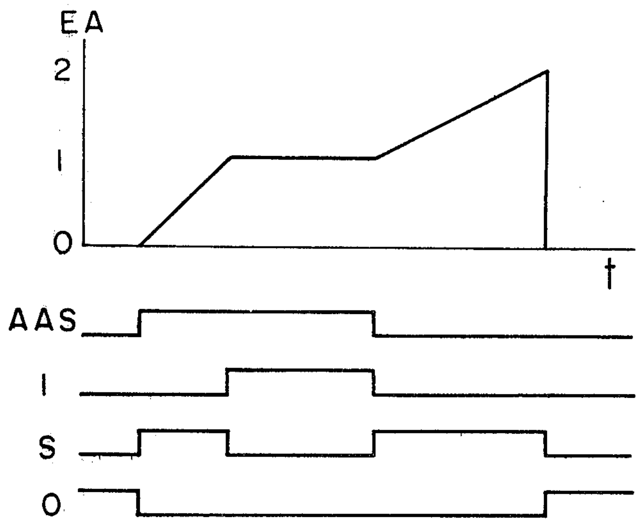
FIG. 6 shows the relationship between an attack sustain signal AAS and an envelope address EA.

FIG. 6 shows the relationships between the attack sustain signal ASS, etc. and the envelope address EA.

Turning back to FIG. 5, in the case where envelope address EA circulates passing through the AND gate 533 and is in the state of $0<EA<1$, when the key switch is turned OFF to alter the attack sustain signal AAS to "0", the AND gate 538 is closed and the OR gate 542 and the AND gate 541 are opened, providing the loop of the envelope address EA passing through the AND gate 535. Since this loop includes the adder 532, the envelope address EA is added with $d_1$ upon each circulation, and shifts from the state of $0<EA<1$ to the state of $EA=1$ and then to the state of $1<EA<2$. Thus, the envelope address EA in the state of $1<EA<2$ circulates via the AND gate 535.

In the case where the envelope address EA in the state of $1<EA<2$ is circulating through the AND gate 535 as mentioned above, it a key switch is turned ON and if all the channels of the same channel areas as the key switch are occupied, the high-speed decay demand signal HDD is produced and a high-speed decay takes place in the channel of the key switch in which a decay has started earlier than the other channels. This operation will hereunder be described.

The channel area code CAC is applied to a multiplexer 550 and the decay start signal DES from the AND gate 519 is applied as a write signal via the multiplexer 550 to a $F_1F_0$ memory 553 or 554 or a latch circuit 555 which corresponds to the channel area corresponding to the decay start signal DES. By this write signal the channel code CHC is written in the $F_1F_0$ memory 553 or 554 or the latch circuit 555. Further, the channel code CAC is provided to a multiplexer 551, by which one of the outputs from the $F_1F_0$ memories 553 and 554 and the latch circuit 555 is selected and applied to a comparator 556. The channel code CHC and the code outputted from the multiplexer 551 are compared by the comparator 556 and when they match with each other, the comparator 556 outputs a high-speed decay time slot signal HDT in the time slot. The high-speed decay time slot signal HDT is provided in the time slot of the channel in which a decay has started earlier than the other channels in each channel area. The high-speed decay demand signal HDD from the AND gate 527 is supplied to an AND gate 548 to derive therefrom a high-speed decay signal HDE in the time slot in which the high-speed decay time slot signal HDT and the high-speed demand signal HDD occur at the same time.

When the high-speed decay signal is developed, since the envelope coefficient is not zero in the abovesaid time slot, the OR gate 542 is open and the OR gate 540 is opened by the high-speed decay signal HDE to keep the AND gate 541 open. In this while, the high-speed decay signal HDE closes the AND gate 538. In other words, during occurrence of the high-speed decay signal HDE, there is provided the loop of the envelope address EA passing through the AND gate 535, the OR gate 536 and the envelope address shift register 530.

The high-speed decay signal HDE is also applied to a decay control circuit 546 to change $d_1$ to $d_2$ only in the abovesaid time slot. Heat, $d_1<d_2<1$. The envelope address EA is added with $d_2$ upon each circulation and the addition ends earlier than in the case of usual addition of $d_1$. When the envelope address EA becomes zero, an AND gate 547 applies a read signal via a multiplexer 552 to the $F_1F_0$ memory 553 or 554 the latch circuit 555 to output therefrom the next channel code CHC and erase the preceding channel code and the next key code is written in the code shift register. 509, newly starting an attack part. The time-division key code KEC and the time-division envelope address EA are outputted in synchronism with the channel code CHC.

The envelope of each tone block is read out of the envelope level memory circuit 103 using the envelope address EA and a block code as input addresses. The memory circuit 103 stores therein five envelope levels according to tone blocks, each envelope level being divided into attack , sustain and decay parts. The envelope level is stored in such a manner that the attack, sustain and decay parts corresponds to the state of $0<EA<1$, $EA=1$ and $1<EA<2$ of the envelope address EA, respectively. Hence, a desired envelope can be set. The output envelope level signal $EVL_1$ of the memory circuit 103 is applied to the multiplier 105 and is multiplied by the tablet envelope signals $TBE_1$ and $TBE_2$ to provide the envelope level signal $EVL_2$, which is supplied to the multiplier 106. The envelope level signal $EVL_1$ varies in the range of 0 to 255 and assumes a value of 128 in the sustain part.

FIG. 7 shows by way of example the waveforms at five stages of the channel counter 502 supplied with the clock CL4 in FIG. 5 and the corresponding timings of the channel code CHC, the channel area code CAC, the block code BLC and the write clock CL5.

Figure 9:
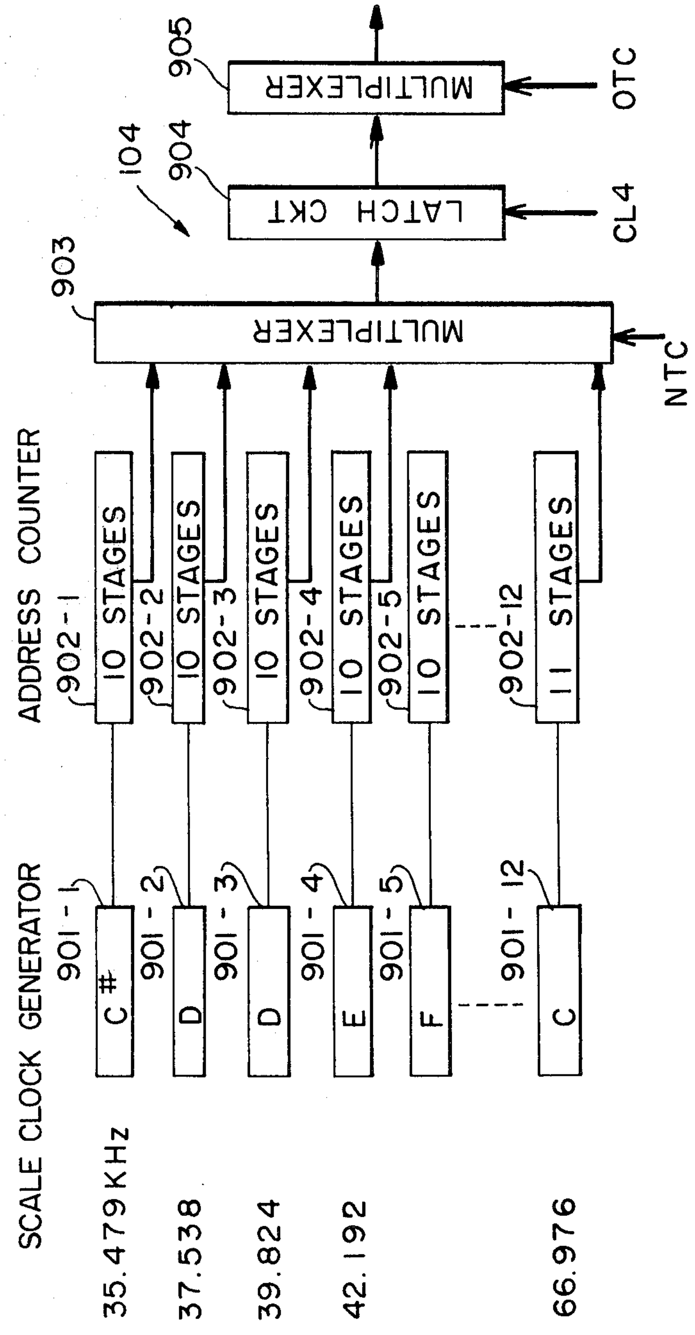
FIG. 9 is a detailed diagram explanatory of an address generator 104 in FIG. 1.

FIG. 9 is a detailed diagram explanatory of the address generator 104 used in FIG. 1. In FIG. 9, scale clocks C# (35.479 KHz) to C (66.976 KHz) are produced by scale clock generators 901-1 to 901-12 and applied to address counters 902-1 to 902-12, respectively. The address counter 902 is composed of 10 or 11 stages and performs counting for each scale at all times and the count value is applied as an address code to a multiplexer 903. The multiplexers 903 and 905 are supplied with the key code KEC from the key assignor 102 and, in this case, the multiplexer 903 is supplied with the note code NTC, by which one of 12 address codes from the address counters 901-1 to 902-12 is selected. The selected address code is latched by the clock CL4 in a latch circuit 904. The latch circuit 904 is a synchronizing circuit for preventing the address code from changing in the time slot because the counting speed of the address counter 902 and the frequency of the clock CL4 are different from each other and are not synchronized with each other. The address code ADC synchronized by the latch circuit 904 with the time-division clock CL4 is provided to the multiplexer 905. The multiplexer 905 is supplied with the octave code OTC included in the key code KEC to pick up a designated one of the 10 or 11 bits of the address code ADC.

Figure 10B:
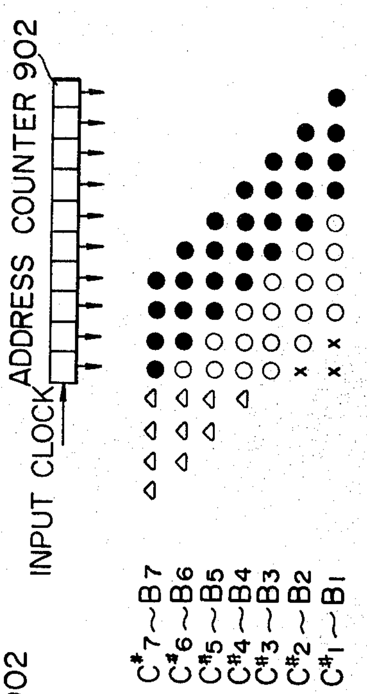
FIGS. 10A and 10B show the relationship between bits to be derived from the address generator of FIG. 9 and octaves.
Figure 10A:
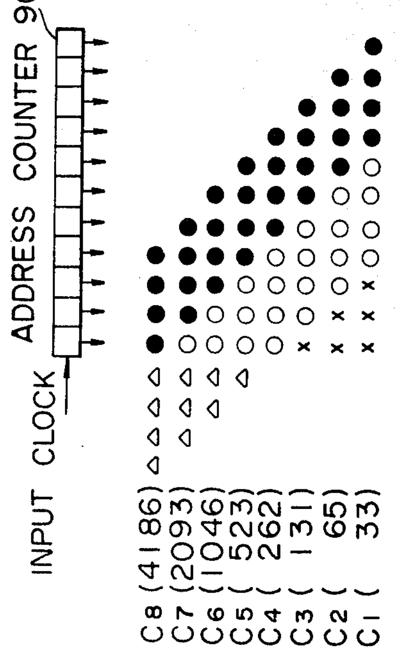

FIGS. 10A and 10B show the relationship between the bit to be picked up and the octave. In FIGS. 10A and 10B, white circles indicate bits to be designated and applied to the waveshape calculator in the cases of $C_8$ to $C_1$ (FIG. 10A) and $C_7$# to $B_7$, $C_6$# to $B_6$, . . . $C_1$# to $B_1$ (FIG. 10B) and black circles indicate bits to be applied to random access memories which will be described later on. Triangles show bits which are not counted for harmonic suppression and are fixed at "0" or "1" and crosses show bits not to be picked up. In short, the following bits are picked up.

| Note | Number of Bits | Stage of Counter |
|---|---|---|
| $C_7$# (2217) ~ $C_8$ (4186) | 4 | 1st to 4th |
| $C_6$# (1109) ~ $C_7$ (2093) | 5 | 1st to 5th |
| $C_5$# (554) ~ $C_6$ (1046) | 6 | 1st to 6th |
| $C_4$# (277) ~ $C_5$ (523) | 7 | 1st to 7th |
| $C_3$# (139) ~ $C_4$ (262) | 8 | 1st to 8th |
| $C_2$# (69) ~ $C_3$ (131) | 8 | 2nd to 9th |

-continued

| Note | Number of Bits | Stage of Counter |
|---|---|---|
| $C_1^{\#}$ (35)~$C_2$ (65) | 8 | 3rd to 10th |
| $C_1$ (35) | 8 | 4th to 11th |

(The parenthesized numeals are fundamental frequencies.) Of the above address codes ADC, the following bits are applied to random access memories 1201 and 1202 which will be described later.

| Note | Number of Bits | Stage of Counter |
|---|---|---|
| $C_7^{\#}$~$C_8$ | 4 | 1st to 4th |
| $C_6^{\#}$~$C_7$ | 4 | 2nd to 5th |
| $C_5^{\#}$~$C_6$ | 4 | 3rd to 6th |
| $C_4^{\#}$~$C_5$ | 4 | 4th to 7th |
| $C_3^{\#}$~$C_4$ | 4 | 5th to 8th |
| $C_2^{\#}$~$C_3$ | 4 | 6th to 9th |
| $C_1^{\#}$~$C_2$ | 4 | 7th to 10th |
| $C_1$ | 4 | 8th to 11th |

Further, the following bits are applied to the waveshape calculator 112.

| Note | Number of Bits | Stage of Counter |
|---|---|---|
| $C_7^{\#}$~$C_8$ | 0 | |
| $C_6^{\#}$~$C_7$ | 1 | only 1st |
| $C_5^{\#}$~$C_6$ | 2 | 1st to 2nd |
| $C_4^{\#}$~$C_5$ | 3 | 1st to 3rd |
| $C_3^{\#}$~$C_4$ | 4 | 1st to 4th |
| $C_2^{\#}$~$C_3$ | 4 | 2nd to 5th |
| $C_1^{\#}$~$C_2$ | 4 | 3rd to 6th |
| $C_1$ | 4 | 4th to 7th |

Accordingly, a change in the address code is 33.5 KHz as the highest. Since the time-division clock CL4 is 1088 KHz and since the number of time slots of the key code KEC is 34, the address code ADC is sampled at 32 KHz.

Figure 11:
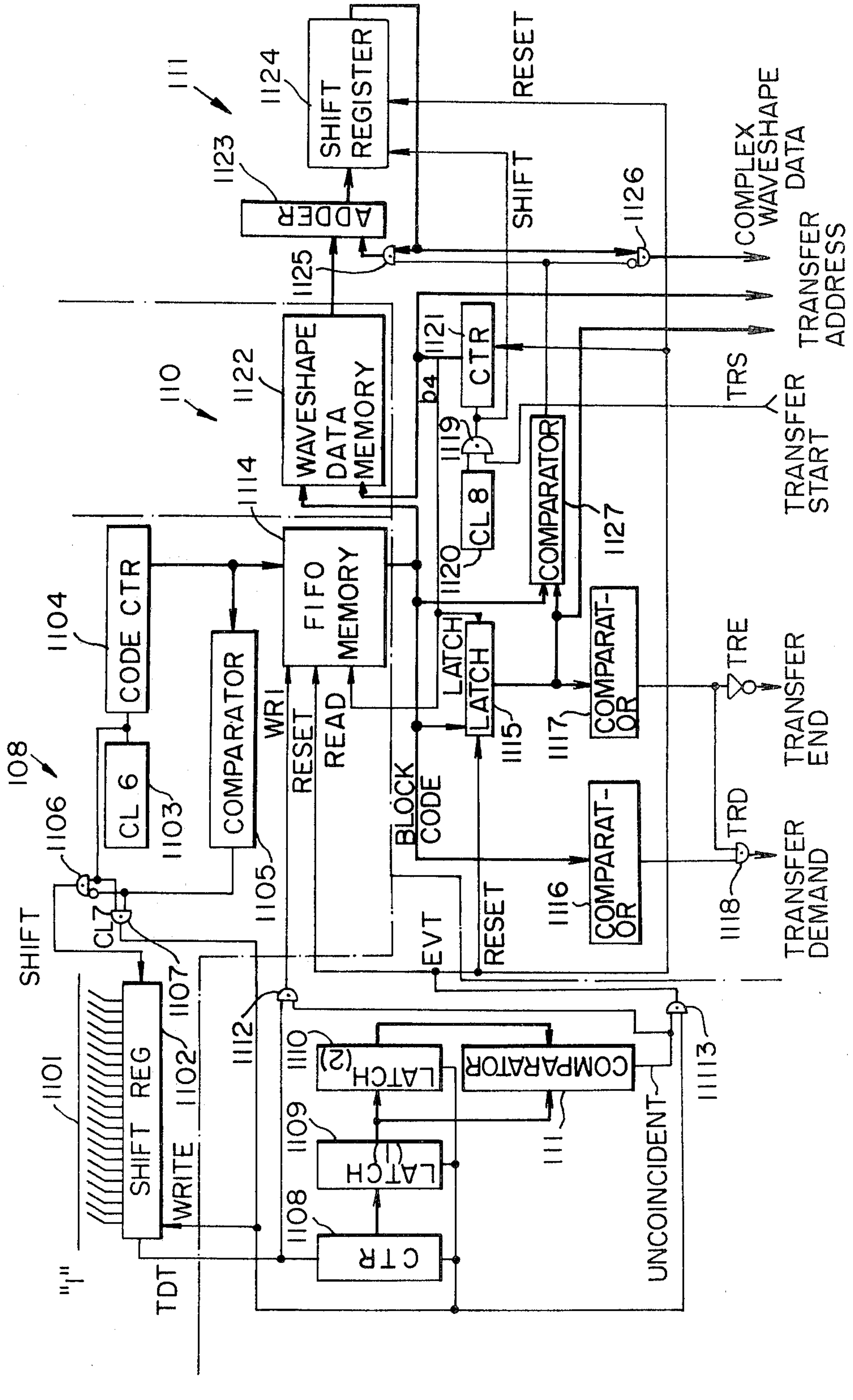
FIG. 11 is a detailed diagram explanatory of one part of each of a tone selection switch 108, a tone control circuit 109, a waveshape data memory circuit 110 and a transfer control circuit 111 in FIG. 1.
Figure 13:
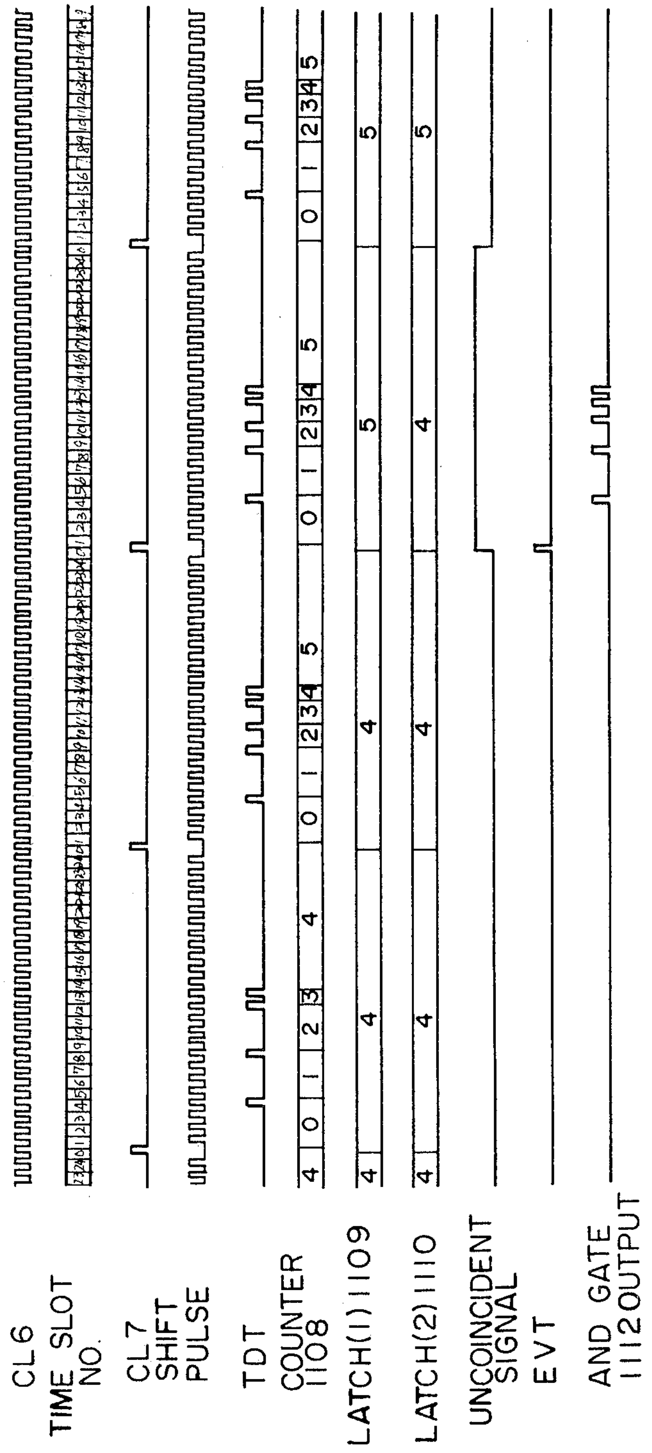
FIG. 13 is a timing chart explanatory of the operation in FIG. 11.

FIG. 11 is explanatory of one part of each of the tone selecting switch 108, the tone control circuit 109, the waveshape data memory circuit 110 and the transfer control circuit 111 utilized in FIG. 1, as indicated by the one-dot chain lines. FIG. 13 is a timing chart explanatory of the operation in FIG. 11.

Figure 12:
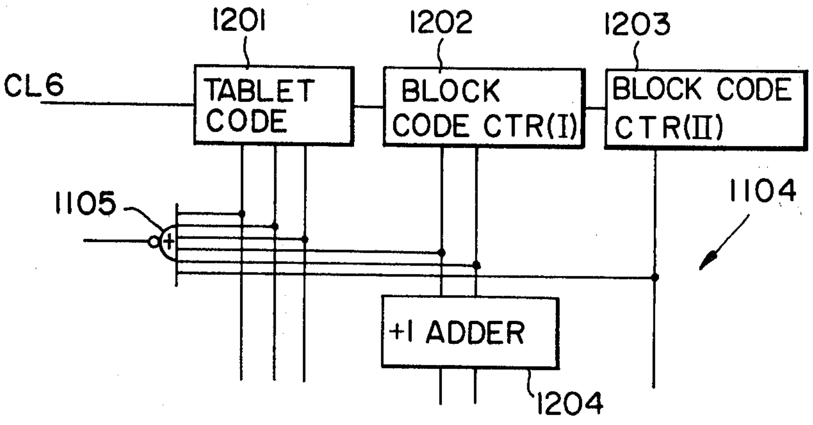
FIG. 12 is a circuit diagram of a code counter 1104 in FIG. 11.

In FIG. 11, for instance, 24 tablet switches 1101, which corresponds to the tone selecting switch 108, are each connected at one end to the logical "1" and connected at the other end to one stage of a parallel-input serial-output shift register with 24 stages. The switch in the ON state and the switch in the OFF state respectively provide logical level signals "1" and "0" to a shift register 1102 at all times. A scanning clock CL6 from a clock generator 1103 is applied to a code counter 1104, which repeats counting of a number larger than that of the tablets, that is, 25 in this case. FIG. 12 is a circuit diagram of the code counter 1104. The code counter 1104 comprises a 5-step tablet code counter 1201, a 3-step block code counter (I) 1202, a binary block code counter (II) 1203 and a +1 adder 1204.

In the present embodiment, the tablets are divided into five tone blocks, i.e. an upper manual (I), an upper manual (II), a lower manual (I), a lower manual (II) and a pedal. Five tablets are assigned to each tone but four tablets to the upper manual only. The tablet code counter 1201 counts 0 through 4 and outputs the count value. The block code counters (I) 1202 and (II) 1203 output block codes 1, 2, 3, 4, 5, 6 and 7 via the +1 adder 1204.

In FIG. 11, a comparator 1105, when the count value of the abovesaid code counter 1104 is zero, applies a gate signal of zero time slot to AND gates 1106 and 1107, which respectively generate a shift pulse and a clock CL7 with the clock CL6. The sampling clock CL7 is provided to the shift register 1102 to write therein the signals of the logical levels "1" and "0" from the tablet switches 1101. The abovementioned shift pulse shifts the shift register 1102, from which the ON state of the tablet which is provided as a time-division multiplex signal TDT which switches back and forth between logical "1" and logical "0" levels. The signal TDT uses, as one frame, five times slots from 0 to 24. A counter 1108 counts the signal TDT for each frame and is reset by the clock CL7. The counter 1108 counts the number of those of the signals TDT which have the level "1", in each frame, that is, the number of tablet switches in the ON state for each frame. The count value of the counter 1108 is stored by the clock CL7 in a latch circuit (1) 1109 and then stored in a latch circuit (2) 1110 by one frame behind. The count values stored in the latch circuits (1) 1109 and (2) 1110 are applied to a comparator 1111, which provides a non-coincidence signal when the both count values do not match with each other. This non-coincidence signal is applied to AND gates 1112 and 1113 to derive therefrom a write signal WR1 and an event signal EVT for input to a $F_1F_0$ memory 1114 based on the signal TDT and the clock CL7. The event signal EVT occurs when the number of tablets in the ON state has changed, and resets the $F_1F_0$ memory 1114, a counter 1121, a shift register 1124 and a latch circuit 1115. With the write signal WR1, the block code and the tablet code of the code counter 1104 are written in the $F_1F_0$ memory 1114.

FIG. 13 shows an example of the above operation in FIG. 11. That is, FIG. 13 shows the timing relationships of the clock CL6, the time slot number, the clock CL7 and the shift pulse in which, for example, tablets ④, ⑧, ⑫ and ⑬ are in the ON state and then a tablet switch ⑩ is altered to the ON state. The contents of the latch circuits (1) 1109 and (2) 1110 having latched therein the count value of the counter 1108 are compared by the comparator 1111 with each other to produce a non-coincidence signal, which is applied to the AND gates 1112, and 1113 to provide therefrom the event signal EVT and the signal TDT.

Turning back to FIG. 11, the block code in the output from the $F_1F_0$ memory 1114 is applied to a waveshape data memory 1122 and, at the same time, to a latch circuit 1115 and a comparator 1116 and the output from the latch circuit 1115 is provided to a comparator 1117. Outputting of the code from the $F_1F_0$ memory 1114 means that the code of the tablet to be processed is written in the $F_1F_0$ memory 1114. When the block code is not zero, the comparator 1116 provides a signal to an OR gate 1118 to output therefrom a transfer demand signal TRD. Where random access memories 1401 and 1402 in FIG. 14, which will be described later on, are not in their simultaneous read state, an AND gate 1414 which is supplied with the transfer demand signal TRD is opened to provide a transfer start signal TRS. The signal TRS opens an AND gate 1119 to permit the passage therethrough of a transfer clock CL8 from a transfer clock generator 1120 for input to a counter 1121. The count value (0 to 15) of the counter 1121 is supplied to the waveshape data memory 1122.

The waveshape data of the respective tablets are each composed of 16 words and their addresses are assigned by the count value (0 to 15) of the counter 1121. The tablet code from the $F_1F_0$ memory 1114 assigns the addresses of 16 words of the tablet waveshape data. That is, the addresses of the waveshape data memory 1122 are such that the block code, the tablet code and the count value of the counter 1121 in the descending order of bits. The transfer clock CL8 is also applied to a shift register 1124 from the AND gate 1119. The waveshape data read out of the waveshape data memory 1122 are accumulated by an adder 1123, the 16-stage shift register 1124 and an AND gate 1125. At this time, the waveshape data memory 1122 is read out at the speed of the clock CL8 and the shift register 1124 is shifted with the clock CL8. The waveshape data are accumulated at first, second, third, . . . and 16th words of the data of each tablet and the complex waveshape data of 16 words are stored in the shift register 1124. A signal $b_4$, which occurs at the fourth bit of the counter 1121, that is, every 16 count values, is applied to a latch circuit 1115 and the $F_1F_0$ memory 1114 to cause the latter to read out the next tablet code every 16 addresses of each waveshape data. The block code output from the $F_1F_0$ memory 1114 and the output from the latch circuit 1115 are compared with each other in a comparator 1127, which outputs a signal of a "0" or "1" level depending upon whether or not the both codes match with each other. The coincidence of the both codes means coincidence of the block codes, and hence implies that the tablet in the same block is newly read out of the $F_1F_0$ memory 1114. The coincidence signal opens the AND gate 1125 and the waveshape data corresponding to the abovesaid tablet are accumulated in the including the adder 1123 and the shift register 1124. On the other hand, that the both codes are different from each other means that the tablet of a different block is read out of the $F_1F_0$ memory 1114. By the "0" level of the non-coincidence signal, the AND gate 1125 is closed to cut off the accumulation loop and an AND gate 1126 is opened through which the complex waveshape data in the shift register 1124 are transferred to the random access memories 1401 and 1402 in FIG. 14. At the same time, waveshape data of a new tablet code of a new block are written in the shift register 1124.

Figure 15:
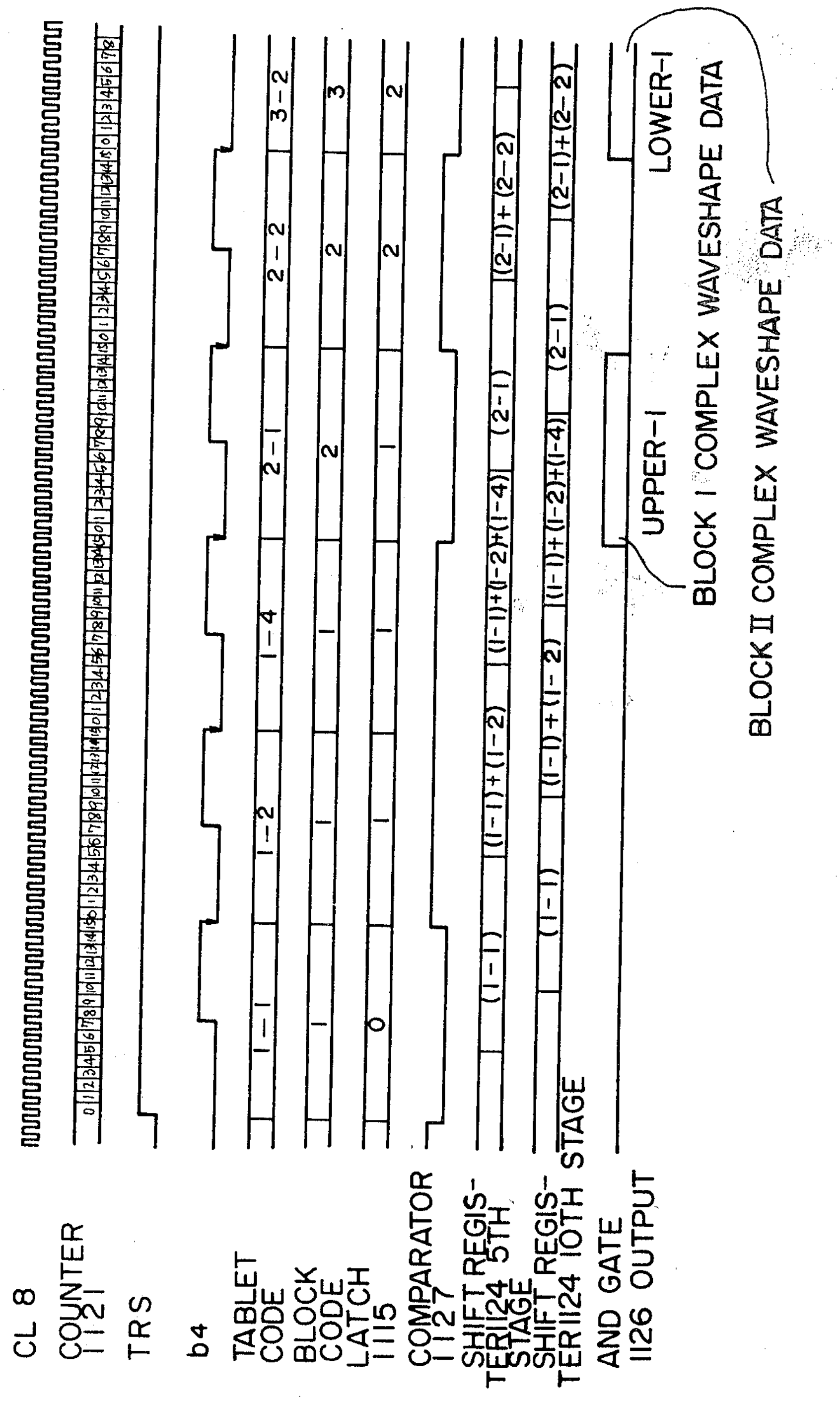
FIG. 15 is a timing charg explanatory of the operation following those of FIG. 13.

FIG. 15 is a timing chart illustrating the operations following those shown in FIG. 13. The clock CL8 is applied to the counter 1121 and counted by the transfer start signal TRS to produce a signal $b_4$ every 16 count values. In this instance, the block code corresponding to the tablet code and the block code used as addresses of the aforesaid waveshape data memory 1122 is latched by the signal $b_4$ in the latch circuit 1115 by one period behind. The coincidence of the block code with the content of the latch circuit 1115 is detected by the comparator 1127. A coincidence signal provided therefrom is applied via the adder 1123 to the shift register 1124 to carry out the illustrated accumulation through fifth and 10th stages of the shift register 1124, outputting from the AND gate 1126 complex waveshape data of each block of, for example, the upper manual, lower manual, etc.

Figure 14:
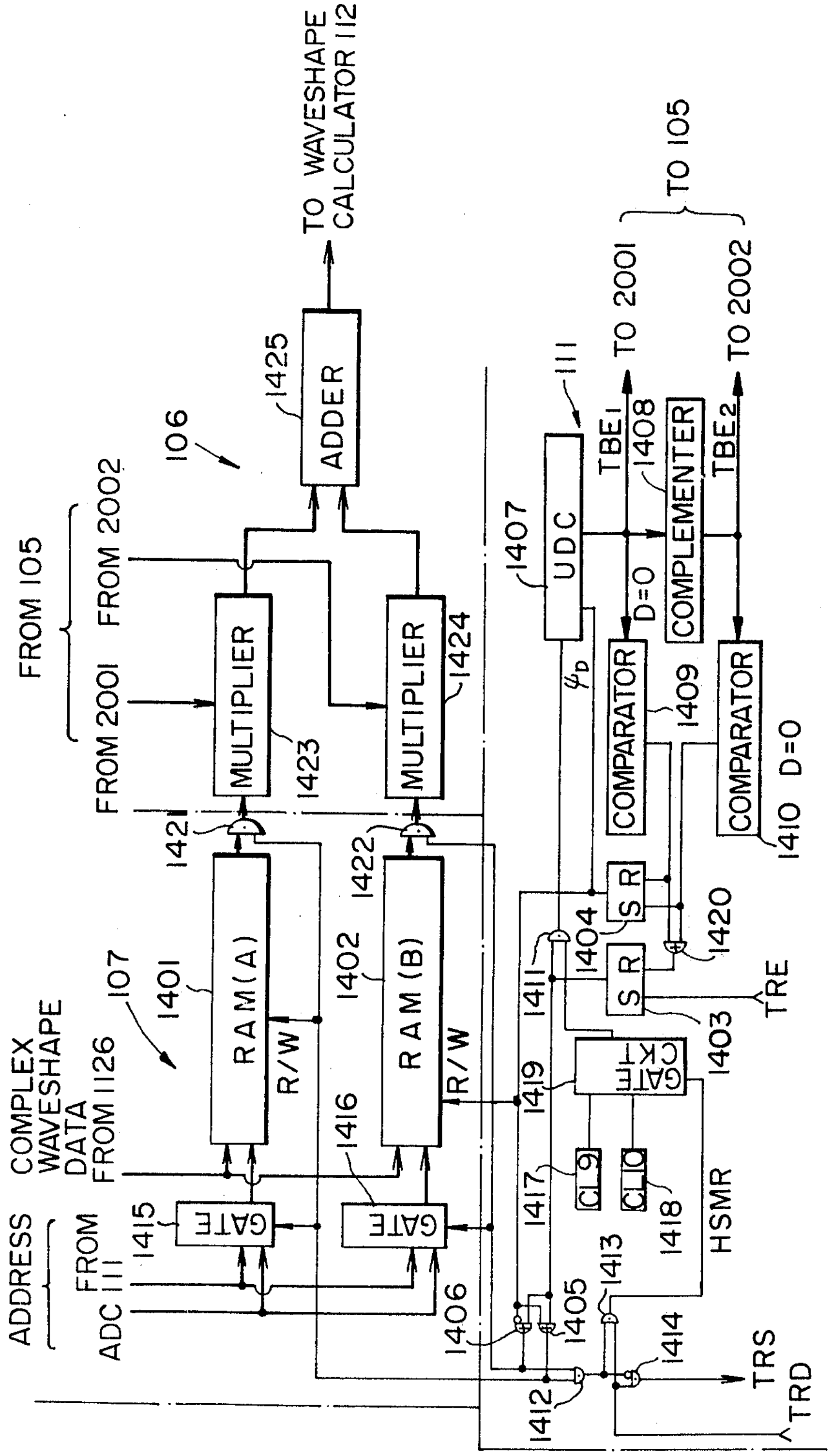
FIG. 14 is a detailed diagram explanatory of one part of each of a latch circuit 107, a multiplier 106 and the transfer control circuit 111 in FIG. 1.

In FIG. 11, when the output code from the $F_1F_0$ memory 1114 is reduced to zero, since the latch circuit 1115 holds the preceding code for one period of the signal $b_4$ outputted from the counter 1112, the transfer demand signal TRD continues to occur and in this period the complex waveshape data of the last block are transferred to the random access memory RAM 1401 or 1402 in FIG. 14 and upon completion of the abovesaid period, the output from the comparator 1117 becomes zero, making a transfer end signal TRE "1".

Figure 16:
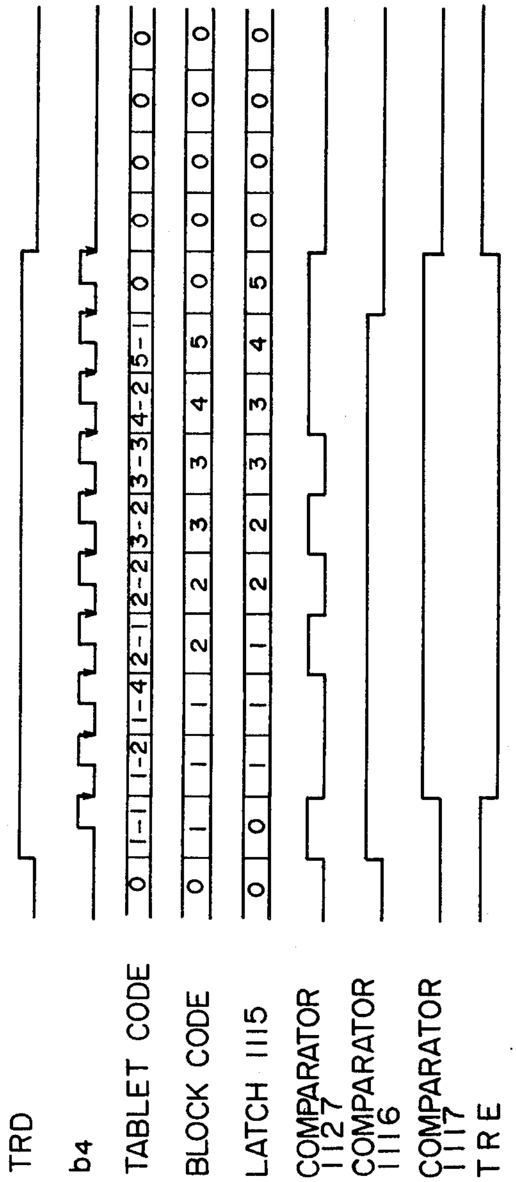
FIG. 16 is a timing chart explanatory of the operations in FIGS. 11 and 14.

FIG. 16 is a timing chart showing the operations described above. In the case where, upon occurrence of the transfer demand signal TRD, the waveform of the signal $b_4$, the tablet code, the block code, the content of the latch circuit 1115 and the waveform of the coincidence signal from the comparator 1127 are provided by the same operation as in the case of FIG. 15 as shown in FIG. 16, when the output code from the FIFO memory 1114 is reduced to zero, the tablet code and the block code become zero and the output from the comparator 1116 drops to zero but the signal $b_4$ is held for one more period and in this while the latch circuit 1115 hold the preceding block code, so that the comparators 1127 and 1117 are also held ON for one more period and then turned OFF, altering the transfer end signal TRE to "1", as shown in FIG. 16.

Next, the circuit operations in the case of a change in the state of the tablet switch will be outlined in the order of the abovesaid operations. The complex waveshape data are read out of the random access memories RAM(A) and RAM(B) in FIG. 14 alternately but here the operations from the time of reading out of the random access memory RAM(A) to the time of reading out of the random access memory RAM(B) are described.

(1) The complex waveshape data are read out of the random access memory RAM(A) only.

(2) The event signal EVT is produced by a change in the state of the tablet switch.

(3) The waveshape data are read out of the waveshape data memory 1122 and the complex waveshape data are calculated in the shift register 1124.

(4) Where the event signal occurs during calculation of the complex waveshape data in the shift register 1124, the calculation data are reset and the operation is returned to the step (3). In the absence of the event signal, the operation proceeds to the next step.

(5) The complex waveshape data thus calculated are transferred to the random access memory RAM(B).

(6) Where the event signal occurs during the transfer of the complex waveshape data, the calculation data are reset and the operation is returned to the step (3). In the absence of the event signal, the operation proceeds to the next step.

(7) In the case of a change in the tablet envelope described later on, the random access memories RAM(A) and RAM(B) are simultaneously read out.

(8) Where the event signal occurs during the simultaneous reading out of the both random access memories, the simultaneous read rate is raised. In the absence of the event signal, the operation proceeds to the next step.

(9) The complex waveshape data are read out of the random access memory RAM(B) only.

Thus, the construction and processing are used which are adapted for the operation at the moment of generation of the event signal.

FIG. 14 is a detailed diagram showing one part of each of the latch circuit 107, the multiplier 106 and the transfer control circuit 111 utilized in FIG. 1. In FIG. 14, the random access memories RAM(A) 1401 and RAM(B) 1402 are to store the complex waveshape data of each block from the AND gate 1126, and are each composed of $16 \times 5 = 80$ addresses. The outputs from flip-flops 1403 and 1404 are applied to OR gates 1405 and 1406 to derive therefrom read-write signals R/W for the random access memories RAM(A) 1401 and RAM(B) 1402, respectively. Let it be assumed that the read/write signal R/W serves as a read signal or write signal depending upon whether it has a "1" level or "0" level. The random access memories RAM(A) 1401 and RAM(B) 1402 are both in the state of read or one of them in the state of read and the other in the state of write dependent upon the logical conditions of the OR gates 1405 and 1406. The random access memories are not put in the state of write at the same time. Now, consider the two states of them separately.

In a first state in which, for example, the memory RAM(B) is in the state of read and the memory RAM(A) in the state of write, the count value of an up-down counter (UDC) 1407 is zero and the output value of a complementor 1408 is a maximum value 128 at their initial state. Comparators 1409 and 1410 output "1" and "0", respectively, to reset both of flip-flops 1403 and 1404, which provide "0" outputs. Accordingly, the OR gates 1406 and 1405 output "1" and "0", respectively, and an AND gate 1411 remains closed.

Upon application of the transfer demand signal TRD in the above state, since an AND gate 1412 remains closed, an AND gate 1414 is opened to provide the transfer start signal TRS and, by the operation described previously in connection with FIG. 11, the block code of the latch circuit 1115 and the count value of the counter 1121 are provided as a address signal and the complex waveshape data are provided as write data from the AND gate 1126. The output levels of the OR gates 1406 and 1405 are "1" and "0", respectively, and the OR gate 1406 applies the address signal to the random access memory RAM(A) 1401. The random access memory RAM(A) 1401 is in the state of write and writes therein the complex waveshape data of each address block designated by the address signal. At this time, the output level of the OR gate 1406 is "1" and applies the address signal ADC from the address generator 104 to the random access memory RAM(B) 1402 to read it out on a time-shared basis. Upon completion of writing in the random access memory RAM(A) 1401, the flip-flop 1403 is set by the leading edge of the transfer end signal TRE to alter the outputs from the OR gates 1405 and 1406 to "1", providing the state of simultaneous read SMR. In this state, the AND gate 1412 outputs "1", by which the AND gate 1414 is closed to stop the transfer start signal TRS and an AND gate 1413 is opened. The case of occurrence of the transfer demand signal TRD at this time will be described later on.

Where the transfer demand signal TRD is not produced, the output level of the AND gate 1413 is "0". Since the output from the flip-flop 1403 is "1", a clock CL9 from a clock generator 1417 is selected by a gate circuit 1419 and applied via the AND gate 1411 to the up-down counter (UDC) 1407. The up-down counter (UDC) 1407 counts 0, 1, 2, 3, . . . 128 and applies the count values as the tablet envelope TBE to a multiplier 2001 and the complementer 1408 applies complement values 128, 127, 126, . . . 0 as the tablet envelope TBE to a multiplier. When the output from the complementer 1408 reaches 0, the comparator 1410 produces a coincidence signal to set the flip-flop 1404 and reset the flip-flop 1403 via an OR gate 1420. The AND gate 1411 is closed to stop the count value of the up-down counter (UDC) 1407 at the maximum value 128. The next counting is down counting because of resetting of the flip-flop 1404. The outputs from the OR gates 1405 and 1406 become "1" and "0", respectively, and the random access memories RAM(A) 1401 and RAM(B) 1402 are are altered to the state of read and the state of write, respectively. Thus, by means of the complementor 1408, a complementary weighted envelope is produced. This is then added to old and new waveshapes so as to faciliate smooth replacement of the waveshapes following the change in the state of the tone selection switch.

In the above manner, the read/write state of the random access memories RAM(A) 1401 and RAM(B) 1402 are reversed by one transfer demand signal TRD. Therefore, the random access memories RAM(A) 1401 and RAM(B) 1402 are read out alternately with each other.

Next, in a second state in which the random access memories RAM(A) 1401 and RAM(B) 1402 are both in the state of read, the flip-flop 1403 is set by the transfer end signal TRE. Upon occurrence of the transfer demand signal TRD, since the AND gate 1412 is in the state of the "1" level to close the AND gate 1414 but open the AND gate 1413, the gate circuit 1419 switches the clock CL9 to a high-speed clock CL10 to provide a state of high-speed simultaneous read HSMR to cause the up-down counter (UDC) 1407 to count at high speed. When the count value of the counter 1407 reaches 128, the output 0 of the complementer 1408 is applied to the comparator 1410 to set the flip-flop 1404 and reset the flip-flop 1403. As a result of this, the OR gate 1405 provides an output "1" and the OR gate 1406 an output "0" to alter the output from the AND gate 1412 to "0", opening the AND gate 1414 and closing the AND gate 1413. At the same time, the AND gate 1411 is closed. Then, the transfer start signal TRS is provided from the AND gate 1414. In this way, the second state is altered again to the abovesaid first state, in which the up-down counter (UDC) 1407 counts 0 through 128 and the random access memories RAN(A) 1401 and RAM(b) 1402 are put to the states of read and write, respectively, as described previously.

Figure 17:
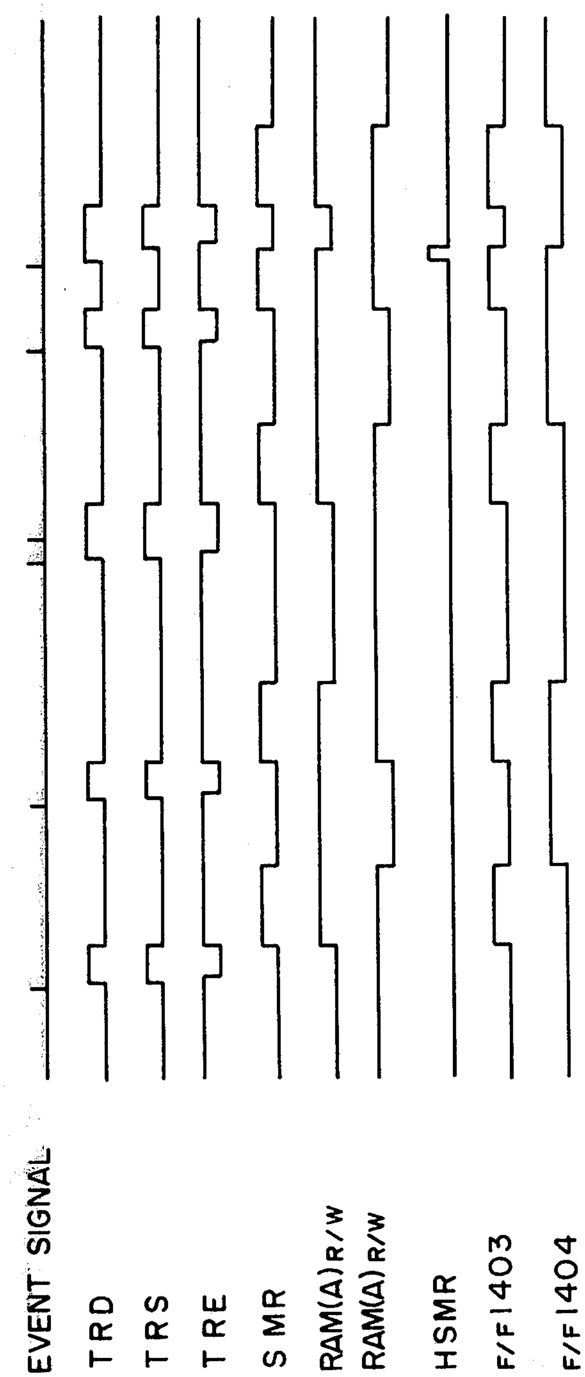
FIG. 17 is a timing chart explanatory of the operation in FIG. 14.

FIG. 17 is a timing chart showing the operations in the first and second states described above. That is, to the transfer demand signal TRD, the transfer start signal TRS and the transfer end signal TRE opposite to them, the random access memories RAM(A) and RAM(B) bear such relationships that they are both in the state of read during the state of simultaneous read SMR but either of them is in the state of read and the other in the state of write during the other states than the simultaneous read state. Upon occurrence of the transfer demand signal TRD during the state of simultaneous read SMR, the state of high-speed simultaneous read HSMR is provided to rapidly put the random access memories into their initial state. In FIG. 17, the relationship between setting and resetting of the flip-flops 1403 and 1404 are also shown.

Turning back to FIG. 14, the random access memories RAM(A) 1401 and RAM(B) 1402 are each divided into five blocks and store the complex waveshape for each block. The random access memories RAM(A) 1401 and RAM(B) 1402 are both read out by the address code ADC time divided into 34, which is the sum total of eight channels of the upper manual (I), eight channels of the lower manual (I), eight channels of the upper manual (II), eight channels of the lower manual (II), one channel of the pedal and one empty channel. Therefore, there is no need of providing a waveshape register for each channel.

AND gates 1421 and 1422 are opened only when the random access memories RAM(A) 1401 and RAM(B) 1402 are both in the state of read, and apply the complex waveshape data stored therein to multipliers 1423 and 1424, respectively. In the multipliers 1423 and 1424, the envelope level signals $EVL_2$ supplied thereto from multipliers 2001 and 2002 and each time-divided complex waveshape data are multiplied and the multiplied outputs from the both multipliers 1423 and 1424 are added together by an adder 1425 and then the added output therefrom is supplied to the waveshape calculator 112.

The envelope level signal $EVL_1$ from the envelope level memory circuit 103 in FIG. 1 varies in the range of 0 to 255, and has a value of 128 in the steady state (at the sustain part).

On the other hand, the tablet envelope, which is the output from the up-down counter (UDC) 1407 and the complementer 1408, changes between 0 and 128, and stops at a value of 0 or 128. 8 bits of the envelope level signal $EVL_1$ and 8 bits of the output from the up-down counter (UDC) 1407 or the complementer 1408 are multiplied in the multipliers 1423 and 1424 to obtain an output signal of 16 bits. But, according to the abovesaid range of the count value, the most significant bit of the 16 bits is 0 and, at the steady part, the low order 7 bits are 0. Then, if the high order 8 bits except the most significant one are used, no ommission occurs at the steady part. At the other parts than the steady one, signals are included in the low order 7 bits but they are ignored because the other parts than the steady one are short in duration. The steady part herein mentioned is the time during which the input count values to the both multipliers 1423 and 1424 stops and the random access memories RAM(A) 1401 and RAM(B) 1402 are not in the state of simultaneous read SMR and the envelope level signal $EVL_1$ is in its sustain state. The other parts other than the steady part is the time during which the random access memories RAM(A) 1401 and RAM(B) 1402 are in the state of simultaneous read SMR or the envelope level signal $EVL_1$ is in other state than the sustain one. However, the time when the envelope level signal $EVL_1$ is 0 is not the steady part.

The multiplied envelope level signal $EVL_1$ is multiplied by the complex waveshape data in the multipliers 1423 and 1424, respectively, and the multiplied outputs therefrom are added together in the adder 1425, thereafter being applied to the waveshape calculator 112 in FIG. 1.

Figure 18A:
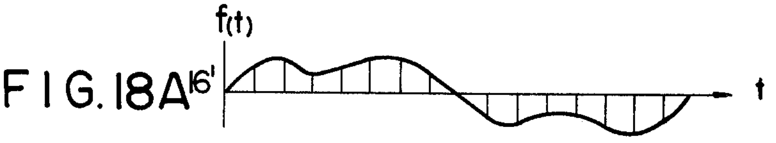
FIGS. 18A, 18B and 18C are explanatory of principles of waveshape calculation.
Figure 18B:
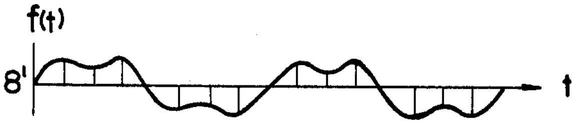
Figure 18C:
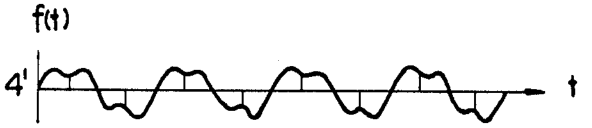

FIGS. 18A, 18B and 18C are explanatory of principles of waveshape calculation. One cycle of a musical waveshape is divided into N periods. Letting a, b and c represent waveshape data and t address information, respectively, the waveshape amplitude f(t) of the period is approximated by $$f(t)=at^2+bt+c$$

and the waveshape data (a, b and c) for each period are calculated in advance.

Let it be assumed that the numbers of periods N are 16, 8 and 4 for 16-, 8- and 4-foot notes, respectively. In the case of the 16-foot note, the waveshape data of one cycle of the waveshape $(a_1b_1c_1)(a_2b_2c_2)(a_3b_3c_3)\ldots(a_{16}b_{16}c_{16})$ are stored in 16 addresses of the waveshape data memory 1122 shown in FIG. 11. In the case of the 8-foot note, the waveshape data of two cycles of the waveshape $(a_1b_1c_1)(a_2b_2c_2)(a_3b_3c_3)\ldots(a_8b_8c_8)(a_1b_1c_1)(a_2b_2c_2)(a_3b_3c_3)\ldots(a_8b_8c_8)$ are stored in the 16 addresses of the waveshape data memory 1122. In the case of the 4-foot note, the waveshape data of four cycles of the waveshape $(a_1b_1c_1)(a_2b_2c_2)(a_3b_3c_3)(a_4b_4c_4)(a_1b_1c_1)(a_2b_2c_2)(a_3b_3c_3)(a_4b_4c_4)(a_1b_1c_1)(a_2b_2c_2)(a_3b_3c_3)(a_4b_4c_4)(a_1b_1c_1)(a_2b_2c_2)(a_3b_3c_3)(a_4b_4c_4)$ are stored in 16 addresses of the waveshape data memory 1122.

In this manner, the waveshape data for each musical waveshape are stored in the waveshape data memory 1122 having 16 addresses. The waveshape data are added together by the transfer control circuit 111 for each address of each tone block to calculate the complex waveshape data for each tone, which are stored in a 16-word 6-block form in the latch circuit 107.

The block code and the high order 4 bits in the address signal ADC from the address generator 104 read out of the latch circuit 107 the complex waveshape data stored at a specificed address of a specified block. The complex waveshape data (a, b, c) thus read out are multiplied by the envelope level signal $EVl_2$ in the multiplier 106 and then applied to the waveshape calculator 112.

On the other hand, a signal of low order bits (4 bits at maximum) of the address signal ADC except the abovesaid high order 4 bits is applied to the waveshape calculator 112. This low order bit signal is given as a signal t of an approximation formula.

Figure 19:
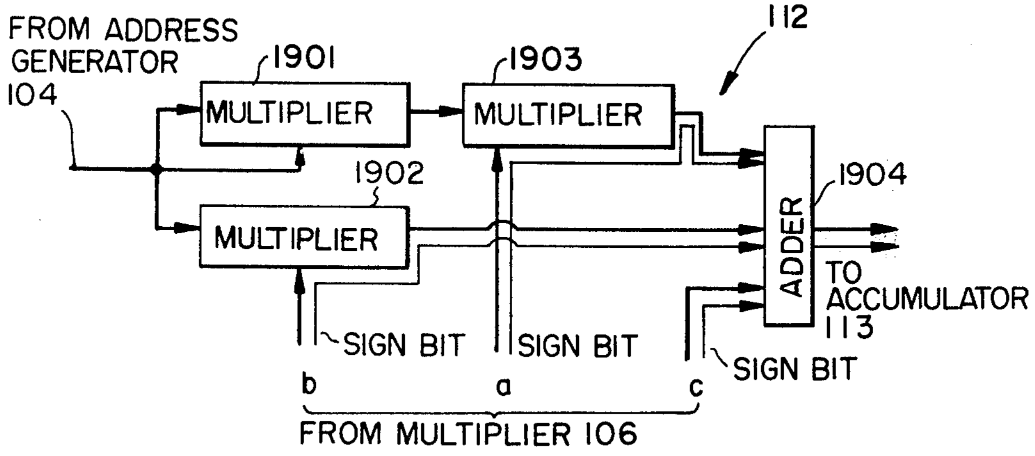
FIG. 19 is a detailed diagram explanatory of a waveshape calculator 112 in FIG. 1.

FIG. 19 is explanatory of the waveshape calculator 112 of FIG. 1 following the abovesaid principles. The signal t from the address generator 104 is provided to multipliers 1901 and 1902 and the output $t^2$ from the multiplier 1901 is applied to a multiplier 1903. The complex waveshape data (a, b) are supplied to the multipliers 1903 and 1902 to calculate therein $at^2$ and bt, respectively. An adder 1904 adds $at^2$, bt and c together to provide an output $at^2+bt+c$. This output $at^2+bt+c$ means the amplitude value of the complex waveshape at the address assigned by the address signal ADC. Thus, the waveshape calculator 112 provides a time-divided waveform signal to the accumulator 113. This signal outputs signals of the same waveform at 32 KHz for every 34 time-division time slots.

Figure 20:
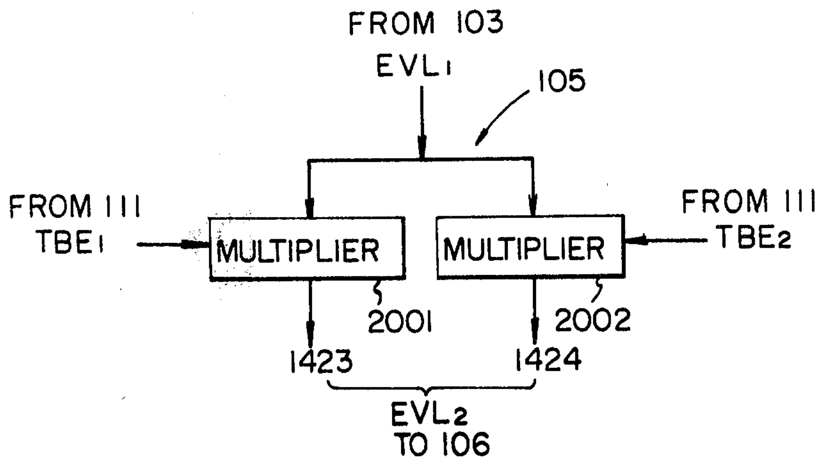
FIG. 20 is explanatory of a multiplier 105 in FIG. 1.

FIG. 20 is explanatory of the multiplier 105 used in FIG. 1. In FIG. 20, the outputs from the up-down counter (UDC) 1407 and the complementer 1408 in FIG. 14, that is, the tablet envelope signals $TBE_1$ and $TBE_2$ are applied to the multipliers 2001 and 2002, respectively, and multiplied by the envelope level signal $EVL_1$ from the envelope level memory 103 in FIG. 1 and the multiplied outputs are provided as the envelope level signal $EVL_2$ to the multipliers 1423 and 1424 in FIG. 14, respectively.

Figure 21:
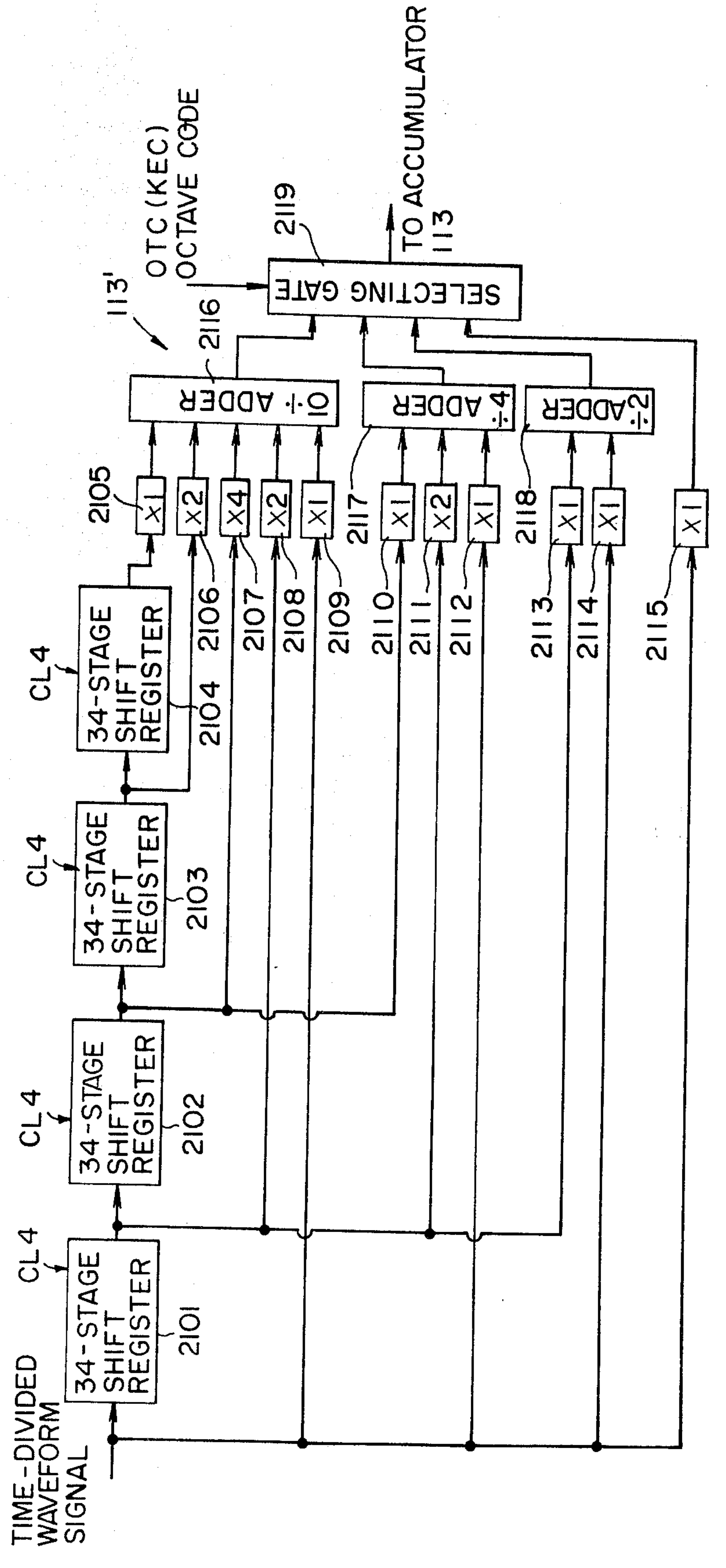
FIG. 21 is a detailed diagram explanatory of a low-frequency compensator provided in an accumulator 113 in FIG. 1.

FIG. 21 is explanatory of a low-frequency range compensator 113' provided in the accumulator 113 in FIG. 1. The circuit 113' is to eliminate sampling frequency components below 32 KHz which appears in the complex waveshape signal because the changing speed of the address signal KEC is lower than 32 KHz in three octaves of a low-pitched sound. In FIG. 21, the time-divided waveform signal is delayed for one period of time division by each of 34-stage shift registers 2101, 2102, 2103 and 2104 which are activated by the clock CL4. Then, the delayed outputs from the shift registers are weighted by weight scalers 2105 through 2115 and added by adders 2116, 2117 and 2118 corresponding to the respective octaves, thereafter being outputted via a selecting gate circuit 2119.

In the lowest octave, five of the waveshape signals delayed in the same time slots appearing every 34 stages are led out of the input and output of each register and weighted with X1, X2, X4, X2 and X1 in time series and added together, thus increasing the number of steps of the waveshape. This provides equivalently a waveshape sampled at 32 KHz and eliminates the aforesaid frequency components.

Such compensation is achieved in the lowest octave and the compensated waveshape is outputted from the adder 2116.

Also in second and third octaves from the lowest one, three and two of the waveshaped signals delayed in the same time slot are led out and weighted with X1, X2, X1 X1 and X1 and added together by the adders 2117 and 2118, respectively, to equivalently provide waveshapes sampled at 32 KHz, thus eliminating the frequency components below 32 KHz in the same manner as described above.

In fourth and higher octaves from the lowest one, such weighting and addition are not carried out and the waveshape signals are applied via the scaler 2115 to the selecting gate circuit 2119.

The complex waveshapes compensated in the respective octaves are provided to the selecting gate circuit 2119 and selectively outputted therefrom by the octave code.

Figure 22:
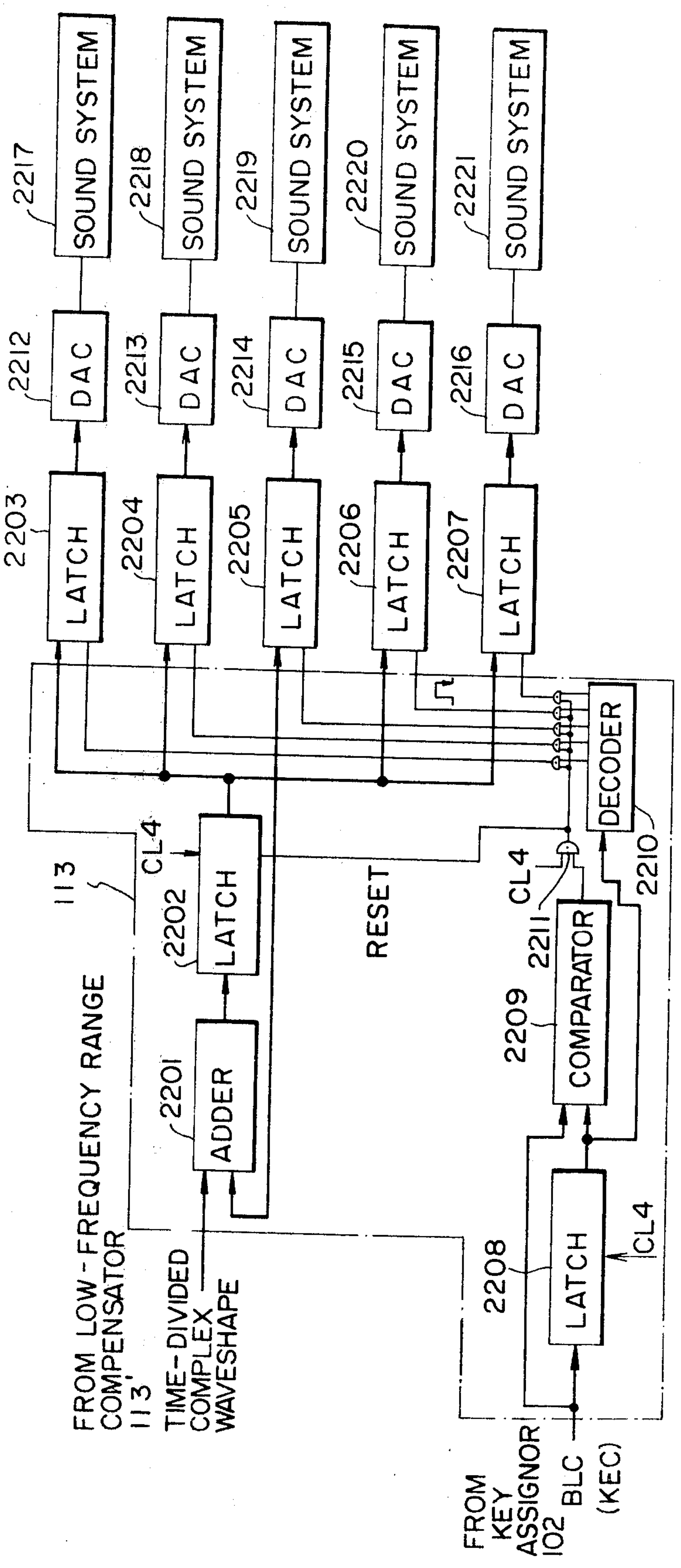
FIG. 22 is a detailed diagram explanatory of the principal part of the accumulator 113 and latch and D-A converters 114 through 118 in FIG. 1.

FIG. 22 is explanatory of the principal part of the accumulator 113 and the latch and D-C converters 114 through 118 in FIG. 1. In FIG. 22, the time-divided waveshape signals sequentially outputted from the selecting gate circuit 2119 in FIG. 21 are added in an adder 2201 and then latched in a latch circuit 2202. Upon completion of addition for the block of each tone, the added output from the adder 2201 is transferred to and latched in any one of latch circuits 2203 through 2207 for each block. At the same time, the latch circuit 2202 is reset, which performs again addition for the next block together with the adder 2201. That is to say, the adder 2201 adds the musical waveshape for each tone block. Write signals for the latch circuits 2203 through 2207 are provided from a decoder 2210. The block code BLC from the key assignor 102 is written in a latch circuit 2208 and delayed by one shot of the clock CL4. The block code BLC and the delayed output from the latch circuit 2208 are compared by a comparator 2209 with each other. A non-coincidence signal, which is derived from the comparator 2209 in the case of non-coincidence, and the clock CL4 are applied to an AND gate 2211 to provide therefrom a write signal. This write signal is fed to the latch circuit 2202 to reset it and, at the same time, to the block designated by the decoder 2210. The decoder 2210 is controlled by the output from the latch circuit 2208. The complex waveshapes of the respective tones stored in the latch circuits 2203 through 2207 are converted by D-A converters (DAC) 2212 through 2216 into analog signals, and then applied to sound systems 2217 through 2221.

Figure 23:
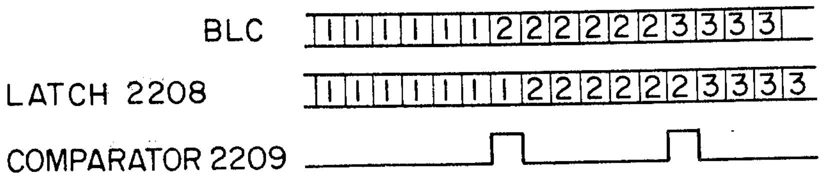
FIG. 23 is a timing chart showing the output from a block code BLC and outputs from a latch circuit 2208 and a comparator 2209 in FIG. 22.

FIG. 23 is a timing chart of the block code BLC and the outputs from the latch circuit 2208 and the comparator 2209 in FIG. 22.

As has been described in the foregoing, according to this invention, time-division time slots, which corresponds to a plurality of channels for producing notes selected by the depression of keyboards, are set for each tone system. The musical waveshape amplitude value of the frequency of the tone system selected on the keyboard is repeatedly calculated in each time slot. Musical waveshape processing is achieved in synchronism with the time slot and selected tone signal is directly obtained, so that a memory for the musical waveshape can be simplified. Further, coupled with the musical waveshape calculation method using a function, the time-division frequency can be selected low and associated processing can be simplified. It is needless to say, however, that this invention is applicable even if some other calculation methods. Moreover, it is also one of the advantages of this invention that setting of the time-division time slots corresponding to the channels facilitates the generation and addition of an envelope.

With the musical waveshape processing described above, the musical waveshape amplitude value of each channel is calculated as $f(t)=at^2+bt+c$, using the waveshape data a, b and c and the address information t, and the envelope signal value is multiplied by the waveshape data a, b and c in synchronism with the time-division time slot. Accordingly, the musical waveshape processing is carried out in synchronism with the time-division time slot corresponding to each channel and a selected tone signal is produced directly, so that a memory for the musical waveshape is simplified. Further, by applying the musical waveshape calculation method of this invention to the time-division time slots corresponding to the channels, the time-division frequency can be set low and related processing systems can be simplified.

Moreover, according to this invention, a change in the state of a tone selection switch is detected by counting time-division multiplex signals with a counter for each frame and by comparing the count values of two successive frame with each other. The change detecting signal is immediately outputted with one frame width in synchronism with each frame, and hence can be used for musical waveshape control. Accordingly, it is possible to effectively achieve, without delay, control for the addition of a complementary weighted envelope and control for clearing an old waveshape by generating an event signal for smooth replacement of old and new waveshapes following a change in the state of the tone selection switch.

It will be apparent that many modifications and variations may be effected without departing from the scope of novel concepts of this invention.

What is claimed is:

1. An electronic musical instrument, comprising calculating means for producing a note by repeatedly calculating the musical waveshape amplitude value of each of channels for producing notes selected on keyboards, using time-division time slots corresponding to the purality of channels, said calculating means comprising a musical waveshape calculator for calculating the musical waveshape amplitude value as a function f(t), wherein $f(t)=at^2+bc+C$, wherein a, b and c are waveshape data stored in a waveshape memory and t is the address information of the data in the memory, and said calculating means further comprising a circuit means for multiplying an envelope signal value synchronized with the time-division time slot of the waveshape data a, b and c.

2. An electronic musical instrument according to claim 1, wherein there is provided a respective counter for counting clocks of each scale of musical notes in synchronism with the time-division time slots, and wherein the count value of the counter is used as an address of data related to the musical waveshape calculator.

3. An electronic musical instrument comprising means for calculating a musical waveshape, a tone control circuit which counts the number of time-division multiplex signals of a tone selection switch which are in the ON state with a counter every frame of time-division multiplexing and compares the count values of two successive frames representing respectively the old and the new frames to detect a change in the state of the tone selection switch from non-coincidence between the count values, thereby controlling the calculation of the musical waveshape from a corresponding old waveshape to a new waveshape, and wherein the tone control circuit has means for imparting complementary weighted envelopes to the old and the new wave shapes so as to facilitate smooth replacement of the waveshapes following the change in the state of the tone selection switch.

4. An electronic musical instrument according to claim 3, wherein the tone circuit has means for generating an event signal indicating the change in the state of the tone selection switch to clear the tone control circuit of the old waveshape for immediately starting calculation of the new waveshape.

* * * * *